United States Patent
Earle et al.

(10) Patent No.: US 12,277,396 B2
(45) Date of Patent: Apr. 15, 2025

(54) ASSESSING AND IMPROVING THE DEPLOYMENT OF LARGE LANGUAGE MODELS IN SPECIFIC DOMAINS

(71) Applicant: Tenyx, Inc, Palo Alto, CA (US)

(72) Inventors: Adam Earle, San Francisco, CA (US); Ali Ziaei, Redwood City, CA (US)

(73) Assignee: Tenyx, Inc., Palo Alto, CA (US)

( * ) Notice: Subject to any disclaimer, the term of this patent is extended or adjusted under 35 U.S.C. 154(b) by 0 days.

(21) Appl. No.: 17/937,383

(22) Filed: Sep. 30, 2022

(65) Prior Publication Data

US 2024/0111960 A1 Apr. 4, 2024

(51) Int. Cl.
*G06F 40/35* (2020.01)

(52) U.S. Cl.
CPC .................................. *G06F 40/35* (2020.01)

(58) Field of Classification Search
CPC ...... G06F 40/35; G06F 16/3329; G06F 17/18; H04L 51/04; H04L 51/02
See application file for complete search history.

(56) References Cited

U.S. PATENT DOCUMENTS

| | | | | |
|---|---|---|---|---|
| 2015/0256675 | A1* | 9/2015 | Sri | H04M 3/5183 379/265.09 |
| 2016/0099892 | A1* | 4/2016 | Palakovich | H04L 51/04 709/206 |
| 2019/0057143 | A1* | 2/2019 | Porter | G06F 16/285 |
| 2019/0213465 | A1* | 7/2019 | Avrahami | G10L 15/197 |
| 2020/0007380 | A1* | 1/2020 | Chen | H04L 51/02 |
| 2020/0137014 | A1* | 4/2020 | Kasireddy | H04L 51/216 |
| 2020/0143265 | A1* | 5/2020 | Jonnalagadda | G06N 3/044 |
| 2021/0158203 | A1* | 5/2021 | Ganti | G06F 8/60 |
| 2021/0304074 | A1* | 9/2021 | Zaremoodi | G06N 3/006 |
| 2021/0321002 | A1* | 10/2021 | DiMaria | H04L 65/4015 |
| 2022/0092441 | A1* | 3/2022 | Zhu | G16H 80/00 |
| 2022/0108080 | A1* | 4/2022 | Munavalli | G06F 40/35 |
| 2022/0277149 | A1* | 9/2022 | Altschul | G06N 3/08 |
| 2022/0383153 | A1* | 12/2022 | Mahmoud | G06N 5/02 |

OTHER PUBLICATIONS

Gao et al., "Dialogue Response Ranking Training with Large-Scale Human Feedback Data", published: Sep. 2020, publisher: arXiv, pp. 1-11 (Year: 2020).*

Wu et al., "Alternating Recurrent Dialog Model with Large-scale Pre-trained Language Models", published: Apr. 2021, publisher: arXiv, pp. 1-18 (Year: 2021).*

Valvoda et al., "Prompting for a conversation: How to control a dialog model?", published: Sep. 2022 (Year: 2022).*

Sun et al., "Improving Language Generation With Sentence Coherence Objective", published: Sep. 2020, publisher: arXiv, pp. 1-11 (Year: 2020).*

* cited by examiner

*Primary Examiner* — Wilson W Tsui

(74) *Attorney, Agent, or Firm* — Nicholson De Vos Webster & Elliott LLP

(57) ABSTRACT

Techniques are described herein for a method of generating a synthetic chat between a customer module and an agent module, wherein: the customer module receives a first prompt and determines a first chat response, and the agent module receives a second prompt and determines a second chat response; generating, by a summarizer module, a summary of the synthetic chat; scoring, by a scorer module, the synthetic chat by comparing the summary of the synthetic chat to the first prompt and the second prompt; adjusting, based on the score, a parameter associated with the synthetic chat.

14 Claims, 12 Drawing Sheets

YOUR NAME IS X AND YOU WANT TO SCHEDULE A TYPE X APPOINTMENT WITH DR. X. YOU ARE AVAILABLE FOR AN APPOINTMENT ANY DAY OF THE WEEK BETWEEN 8:00AM – 11:00AM.

PROMPT 882A FOR CUSTOMER MODULE 204A

YOUR NAME IS Y AND YOU WANT TO SCHEDULE A TYPE X APPOINTMENT WITH DR. X OR DR. Y. YOU ARE AVAILABLE FOR AN APPOINTMENT ANY DAY OF THE WEEK BETWEEN 11:00AM – 3:00PM.

PROMPT 882B FOR CUSTOMER MODULE 204B

YOU ARE A RECEPTIONIST WORKING IN THE OFFICE OF DR. X AND DR. Y. YOU KNOW THAT DR. X ONLY PERFORMS TYPE X APPOINTMENTS AND DR. Y ONLY PERFORMS TYPE Y APPOINTMENTS. DR. X IS ONLY AVAILABLE ON WEEKDAYS BETWEEN 9:00AM – 2:00PM. DR. Y IS ONLY AVAILABLE ON WEEKDAYS BETWEEN 12:00PM – 3:00PM.

PROMPT 884 FOR AGENT MODULE 206

| Customer Name | Scheduled Dr. | Appointment Time | Appointment Type |
|---|---|---|---|
| N/A | Dr. X | 9:00am | Type X |

RESULTS OF SUMMARIZER MODULE 208 OF SYNTHETIC CHAT 1
TABLE 886

| Customer Name | Scheduled Dr. | Appointment Time | Appointment Type |
|---|---|---|---|
| X | Dr. X | 11:00am | Type X |

RESULTS OF SUMMARIZER MODULE 208 OF SYNTHETIC CHAT 2
TABLE 810

| Customer Name | Scheduled Dr. | Appointment Time | Appointment Type |
|---|---|---|---|
| Y | Dr. Y | 12:00pm | Type Y |

RESULTS OF SUMMARIZER MODULE 208 OF SYNTHETIC CHAT 3
TABLE 814

| Customer Name | Scheduled Dr. | Appointment Time | Appointment Type |
|---|---|---|---|
| Y | Dr. X | 12:00pm | Type X |

RESULTS OF SUMMARIZER MODULE 208 OF SYNTHETIC CHAT 4
TABLE 818

| Synthetic Chat 1 Score |
|---|
| 75 |

RESULTS OF SCORER MODULE 410 OF SYNTHETIC CHAT 1
TABLE 888

| Synthetic Chat 2 Score |
|---|
| 100 |

RESULTS OF SCORER MODULE 410 OF SYNTHETIC CHAT 2
TABLE 812

| Synthetic Chat 3 Score |
|---|
| 50 |

RESULTS OF SCORER MODULE 410 OF SYNTHETIC CHAT 3
TABLE 816

| Synthetic Chat 4 Score |
|---|
| 100 |

RESULTS OF SCORER MODULE 410 OF SYNTHETIC CHAT 4
TABLE 820

FIG. 8

ASSESSING AND IMPROVING THE DEPLOYMENT OF LARGE LANGUAGE MODELS IN SPECIFIC DOMAINS

BACKGROUND

The field of Artificial Intelligence (AI) currently focuses on the implementation of artificial neural network systems that aim to mimic the functionality of neurons in the brain. Machine learning is a sub-area of AI in which a machine learning model is trained to perform one or more specific tasks. For instance, a machine learning model can be trained to perform a target task by relying on patterns and inferences learned from training data, without requiring explicit instructions pertaining to how the task is to be performed. Large language models (referred to herein as LLMs) are neural networks trained to mimic human language. LLMs are trained to predict a next word in a block of text. This training allows LLMs to mimic human language by predicting a response to a prompt, or a natural language instruction. The more detail provided in the prompt, the more specific the LLM generates the likely completion of the prompt (e.g., the outcome associated with the task). Generally, prompts are written and ingested by the LLM as a natural language instruction.

SUMMARY

Techniques are described herein for a method of assessing and improving the deployment of large language models in specific domains. The method includes generating a synthetic chat between a first module and a second module, wherein: the first module receives a first prompt and determines a first chat response, and the second module receives a second prompt and determines a second chat response; generating, by a third module, a summary of the synthetic chat; scoring, by a fourth module, the synthetic chat by comparing the summary of the synthetic chat to the first prompt and the second prompt; adjusting, based on the score, a parameter associated with the synthetic chat.

BRIEF DESCRIPTION OF THE DRAWINGS

The detailed description is described with reference to the accompanying drawings in which:

FIG. 8 illustrates an example implementation of the machine learning system including a customer module, an agent module, a summarizer module, and a scorer module, in accordance with one or more embodiments;

DETAILED DESCRIPTION

Large language models (LLMs) are trained using an abundance of training data such that billions of hyperparameters that define the LLM are tuned. In operation, LLMs are trained using any text on the internet as training data. Training on such large training data allows the LLM to identify tone and style in a received input text and mimic such tone and style in a response. The LLM learns how to extract meaningful features (e.g., underlying patterns, characteristics, processes, etc.) of human language. As such, LLMs are able to mimic human language by generating responses that are coherent and contextualized. These models are well suited to form conversations (e.g., taking turns asking questions and providing responses) by predicting words (or sequences of words) that are tailored to the style and context of the conversation. LLMs can also be trained to extract information (or otherwise summarize) received text inputs. Such summary (or paraphrase) of the received text input is coherent with respect to the input and contextualized with respect to style and tone.

Conventional LLMs are so well-tuned to mimic style and tone that such models are difficult to evaluate and may produce unethical or otherwise racist/misogynistic responses. The coherence of the training data reflects the biases of society and such biases are possible in LLM responses. Aspects of the present disclosure are directed to a system that assesses and improves the deployment of LLMs in specific domains, making LLMs more reliable.

Figure 1:
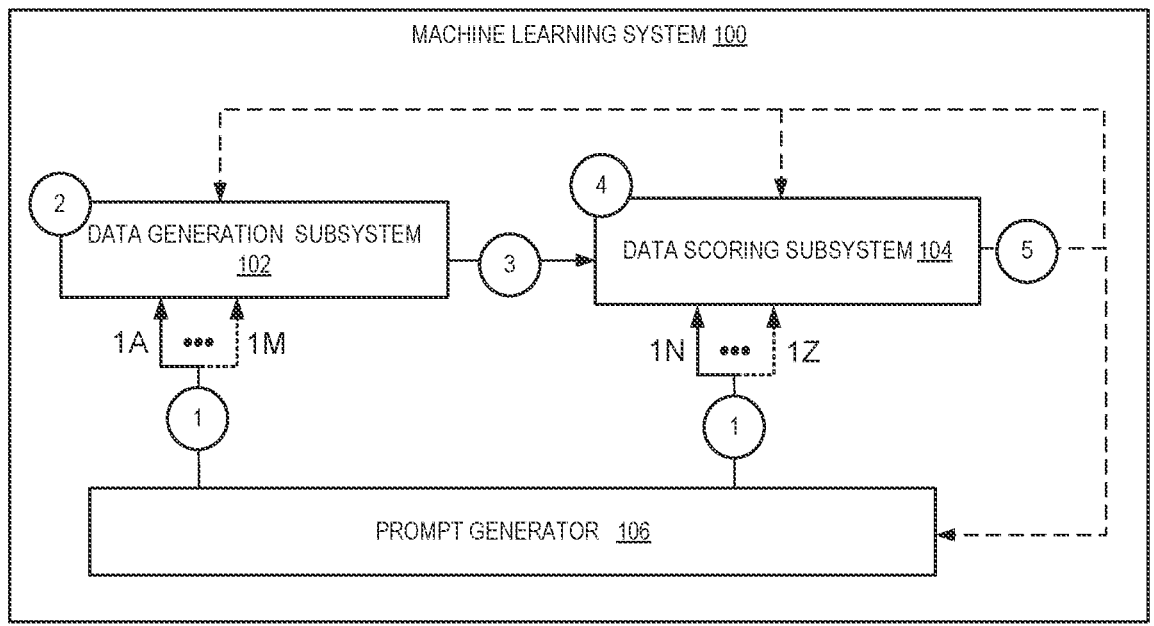
FIG. 1 illustrates a diagram of assessing and improving the deployment of LLMs in a specific domain, in accordance with one or more embodiments.

FIG. 1 illustrates a diagram of assessing and improving the deployment of LLMs in a specific domain, in accordance with one or more embodiments. As shown in FIG. 1, embodiments may include a machine learning system 100. In some embodiments, machine learning system 100 may be incorporated into an application, a suite of applications, etc. or may be implemented as a standalone system which interfaces with an application, a suite of applications, etc. The machine learning system 100 learns to assess and improve the deployment of LLMs using a data generation subsystem 102 and a data scoring subsystem 104.

The data generation subsystem 102 is configured to generate synthetic data. The synthetic data is a conversation or a chat between interlocutors. For ease of description, the synthetic conversation is in a medical setting. For example, customers are described as scheduling appointments with an agent such as a representative. However, synthetic data may be generated in any domain. The data scoring subsystem 104 is configured to score the generated conversation between the interlocutors. A conversation will receive a high score if the interlocutors (1) share relevant information during the course of the conversation and/or (2) mimic human behavior (with respect to linguistic properties such as the vocabulary used in the conversation, any repetition of words/questions in the conversation, the complexity of the conversation, the question/answer ordering, etc.). In an example, the data scoring system 104 will score the generated conversation between the interlocutors with a high score if one interlocutor suppresses superfluous information in the conversation.

Generally speaking, the data generation subsystem 102 drives the behavior of the data scoring subsystem 104. That is, the data scoring subsystem 104 scores the synthetic data generated by the data generation subsystem 102. The data scoring subsystem 104 is able to improve the performance of the data generation subsystem 102 (e.g., the questions/answers driving the synthetic chat) because the tasks performed by the data scoring subsystem 104 (e.g., conversation summarization, conversation scoring) are simpler than the tasks performed by the data generation subsystem 102 (e.g., generation of a conversation by predicting completions of a prompt). Accordingly, as long as the accuracy/performance of the data generation subsystem 104 is greater than the performance of the data generation subsystem 102, then the data scoring subsystem 104 will improve the data generation subsystem 102.

Described with reference to FIG. 2, the data generation subsystem 102 and the data scoring subsystem 104 include various LLMs (e.g., the customer module 204, the agent module 206, the summarizer module 210, and/or the manager module 212). As described herein, LLMs operate responsive to receiving a prompt. As such, prompt generator 106 generates prompts for any LLMs in either the data generation subsystem 102 or the data scoring subsystem 104. The prompt generator 106 generates prompts in such a way that the prompt may be sampled from and optimized (e.g., via the adjuster module, as described here).

In some embodiments, the prompt generator 106 provides prompts to the LLMS based on a manually entered prompt. For example, a user may input a free text description of a specific scenario. In other embodiments, the prompt generator 106 automatically generates prompts. In an example implementation, the prompt generator 106 can perform any suitable sampling mechanism (e.g., random sampling, weighted sampling, etc.) to generate a prompt for a LLM using state information. State information represents a "state of mind" unique to a particular LLM and includes facts specific to the behavior/operation of the LLM and/or other general facts accessible to the LLM. For example, the prompt generator 106 may randomly sample state information for a particular LLM from categories of state information. As described herein, categories of state information include preferences of the LLM (e.g., doctor preferences, appointment time preferences, etc.), a name assigned to an LLM, specializations (e.g., performing various types of surgeries), other general facts (e.g., operating hours of a doctor office, a geographic location of the doctor office, a day of the week), and the like. The prompt generator 106 applies the randomly selected state information into a template prompt such that the template prompt becomes unique to a particular LLM for a particular synthetic conversation.

At numeral 1, the prompt generator 106 initializes prompts for the LLMs in the data generation subsystem 102 and the data scoring subsystem 104. As described herein, the prompt for each LLM is unique. As such, the prompts provided to each of a number of M LLMs in the data generation subsystem 102 (indicated by numerals 1A-1M) are unique. Similarly, the prompts provided to each of a number of N LLMs in the data scoring subsystem 104 (indicated by numeral 1N-1Z) are unique.

At numeral 2, interlocutors, a part of the data generation subsystem 102, interact to generate synthetic data. An interlocutor is a speaker (whether real or manufactured such as an LLM) participating in a communication. Interlocutors of the data generation subsystem 102 are described in more detail with respect to FIG. 2. The generation of synthetic data includes multiple iterations of interactions between the interlocutors. The interaction of the interlocutors is described with reference to FIG. 2. As described herein, the prompt generator 106 augments the prompts associated with each LLM of each interlocutor every iteration of the synthetic data generation. At numeral 3, the data generation subsystem 102 passes the synthetically generated data to the data scoring subsystem 104. At numeral 4, the data scoring subsystem 104 extracts state information communicated in the synthetic chat and scores the synthetic chat. At numeral 5, the score of the synthetic chat determined by the data scoring subsystem 104 is used to adjust a parameter associated with the synthetic chat. As described herein, parameters associated with the synthetic chat include at least one of: (1) one or more prompts of the LLMs; (2) one or more LLMs of the data generation subsystem 104 and the data scoring subsystem 104 (e.g., weights of the LLMS); (3) a frequency of assistance by a manager module; (4) any adjustment of a hyperparameter. In some embodiments, a distribution determined by one or more LLMs is rescored using the score of the synthetic chat.

In some embodiments, the machine learning system 100 is configured to receive configuration parameters. One or more users may configure preferences and/or otherwise configure the parameters of the machine learning system 100. For example, the machine learning system 100 may receive a one or more thresholds.

The machine learning system 100 is configured to store data utilized during the execution of the machine learning system 100. For example, the machine learning system 100 can store thresholds, scores, synthetic chats, rule sets (e.g., executed by a manager module, described further herein), one or more neural network libraries/functions, and the like.

In some implementations, the machine learning system 100 hosts the one or more modules of the machine learning system 100 (e.g., the customer module 204, the agent module 206, the manager module 212, the summarizer module 208. The scorer module 410, and/or the adjuster module 402). In these implementations, the machine learning system 100 executes local processors/memory to perform one or more functions of the one or more modules. In other implementations, the machine learning system 100 remotely accesses the one or more modules. For example, the machine learning system 100 may call one or more servers, processors, etc. hosted in a cloud computing environment. In these implementations, the machine learning system 100 calls one or more other systems, processors, service providers, etc., to perform one or more functions of the modules of the machine learning system 100.

Figure 2:
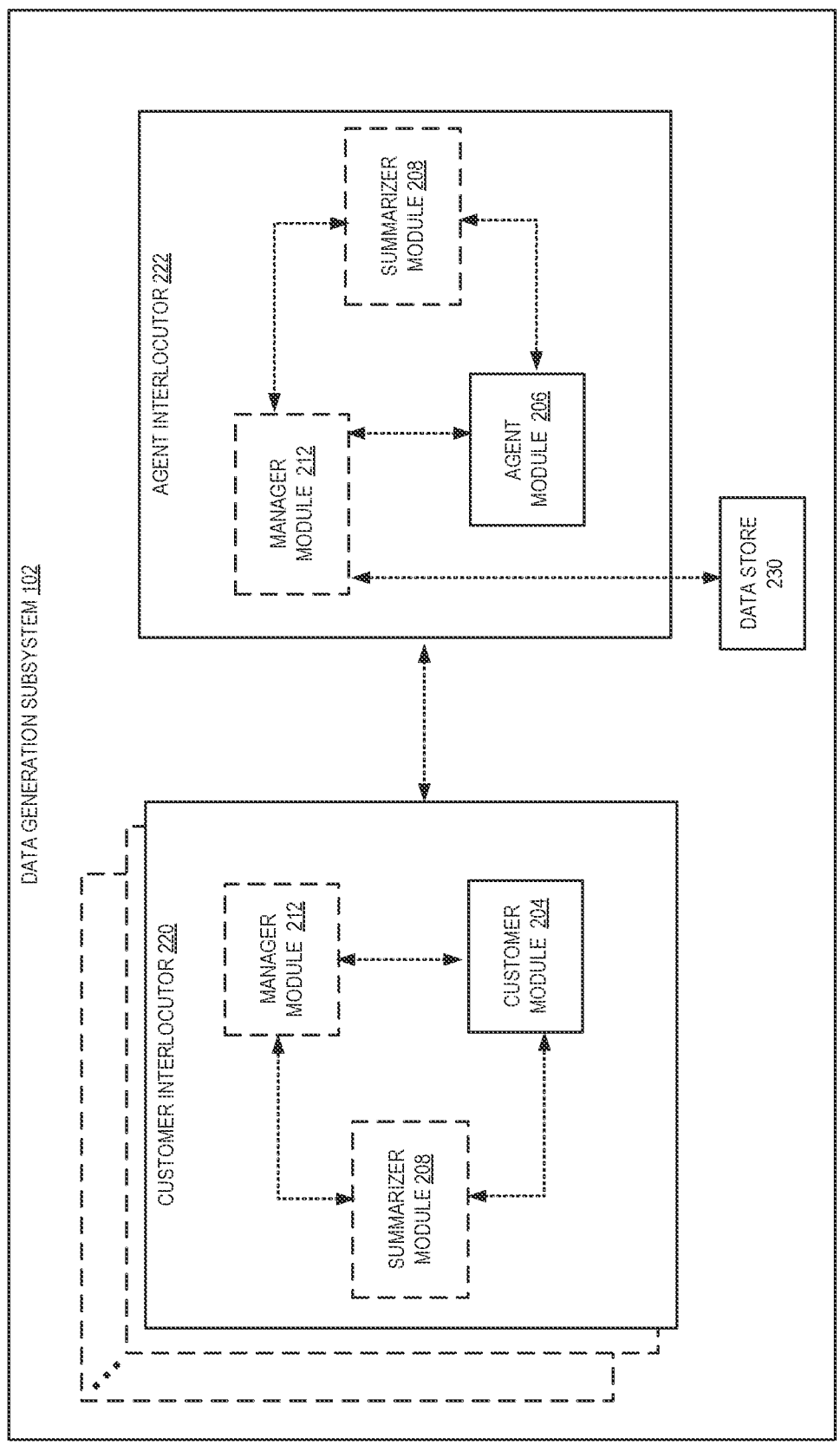
FIG. 2 illustrates interlocutors of the data generation subsystem, in accordance with one or more embodiments.

FIG. 2 illustrates interlocutors of the data generation subsystem 102, in accordance with one or more embodiments. The data generation subsystem 102 generates synthetic data using interlocutors. Synthetic data includes synthetic conversations (also referred to herein as synthetic chats) between an agent interlocutor 222 and one or more customer interlocutors 220. In an example implementation, a multi-party synthetic conversation is generated if multiple customer interlocutors 220 communicate in a single conversation with a single agent interlocutor 222. In another example implementation, a single party synthetic conversation is generated if a single customer interlocutor 220 communicates with a single agent interlocutor 222. In some embodiments, the data generation subsystem 102 is configured to execute multiple single party conversations simultaneously. For example, the data generation subsystem 102 may execute a first conversation between an agent interlocutor 222 and customer interlocutor 220A (not shown), and a second simultaneous and separate conversation between the agent interlocutor 222 and customer interlocutor 220B (not shown). In some implementations, additional interlocutors are executed in the data generation subsystem 102. For example, the data generation subsystem 102 may include one or more manager interlocutors (not shown) configured to communicate with the agent interlocutor 222.

In some embodiments, the agent interlocutor 222 interacts in different domains using different prompts. In other embodiments, the agent interlocutor 222 interacts in different domains with assistance provided by domain-specific manager interlocutors. For example, the same agent interlocutor 222 interacts in an alternate domain supplemented by a manager interlocutor tuned to provide assistance in the alternate domain. In yet other embodiments, different interlocutors with different modules are configured. For example, in an alternate domain, a doctor interlocutor may interact with one or more patient interlocutors.

Each interlocutor includes at least one module. For example, the customer interlocutor 220 includes at least the customer module 204, and the agent interlocutor 222 includes at least the agent module 206. The customer module 204 and the agent module 206 are LLMs trained to generate a likely completion of a prompt.

As described herein, LLMs are trained to mimic a human response (otherwise referred to herein as generate a likely completion), responsive to receiving a prompt. Accordingly, each LLM, including the customer module 204, agent module 206, and/or manager module 212 is configured to receive a unique prompt representing a unique parameterized state of mind. As described herein, prompts include a free text description of a scenario (e.g., a preamble) and a free text description codifying a behavior of a LLM (e.g., state information). Prompts are provided as inputs to LLMs. An example of an agent prompt is provided below:

This is a conversation between an agent and a customer. You are the agent. You work at a medical booking institution. The date is Friday the 12$^{th}$. Your name is A. You should be polite. You should never ask the same question twice.

An example of a customer prompt is provided below:
This is a conversation between a customer and an agent. You are the customer. You want to reschedule an appointment to Wednesday the 7$^{th}$ at 4 pm. You cannot take any time appointment time later than 3:00 pm.

As described herein, prompts can be automatically generated via the prompt generator 106. In an example implementation, the prompt generator 106 generates prompts by randomly sampling state information from categories containing pools of state information. Table 1 below indicates illustrative categories of state information for a customer module and a corresponding pool of state information.

TABLE 1

Categories and State Information for Agent Modules

| Category | Pool of State Information | | | |
|---|---|---|---|---|
| Available Dr. | Dr. X | Dr. Y | Dr. Z | Dr. A |
| Dr. Availability Time | Sample any two times between 7:00 am and 7:00 pm | | | |
| Appointment Types | Type A | Type B | Type C | Type D |

TABLE 1-continued

Categories and State Information for Agent Modules

| Category | Pool of State Information | | | |
|---|---|---|---|---|
| Appointment Locations | Location A | Location B | Location C | Location D |

Table 2 below indicates illustrative categories of state information for an agent module and a corresponding pool of state information.

TABLE 2

Categories and State Information for Customer Modules

| Category | Pool of State Information | | | |
|---|---|---|---|---|
| Customer Availability | Sample two times between 7:00 am and 7:00 pm | | | |
| Dr. Preferences | Dr. X | Dr. Y | Dr. Z | Dr. B |
| Appointment Type Preferences | Type A | Type B | Type C | Type D |

Table 3 below indicates illustrative categories of state information for a manager module and a corresponding pool of state information.

TABLE 3

Categories and State Information for Manager Modules

| Category | Pool of State Information |
|---|---|
| Interject comments after N iterations | Select integer between 1:5 |
| Interject comments every M iterations | Select integer between 1:5 |

The prompts are updated or otherwise augmented iteratively (e.g., by the prompt generator 106), as the customer interlocutor 220 shares information with the agent interlocutor 222 in a conversation.

In some embodiments, a user preconfigures an interlocutor to initiate a synthetic conversation. For example, a prompt for the customer module 204 may include information such as "You begin the conversation." In other embodiments, interlocutors initiate synthetic conversations according to a sequence (e.g., customer module initiates synthetic conversation 1, manager module initiates synthetic conversation 2, customer module initiates synthetic conversation 3, agent module initiates synthetic conversation 4). In yet other embodiments, the prompt generator 106 samples a distribution to declare which interlocutor initiates the synthetic conversation. The interlocutor with the highest (or lowest) sampled integer initiates the synthetic conversation.

In some embodiments, the prompt generator 106 (or user) applies constraints to one or more interlocutors. For example, the prompt generator 106 may bias a manager interlocutor (not shown), prohibiting the manager interlocutor from initiating a synthetic conversation. In another example, the prompt generator 106 may configure the agent interlocutor 222 (via the agent module 206) to initiate a synthetic conversation in response to silence after a duration of time. For instance, if a customer interlocutor 220 (via customer module 204) does not initiate a conversation in 3 seconds, the agent interlocutor 222 (via agent module 206) may initiate the synthetic chat by responding "Hello, is anyone there?"

Each iteration, the prompt generator 106 updates (or otherwise augments) the LLMs (e.g., the agent module 206, the customer module 204, the manager module 212, and the summarizer module 208) with a chat response communicated by the interlocutor. In particular, each LLM prompt is updated with the chat response (or a processed and/or summarized version of the chat response). In response to receiving the updated prompt, the agent module 206, customer module 204 and/or manager module 212 determines a likely completion (e.g., a chat response). The likely completion is a probability distribution of a set of next words in an iteration of the synthetic chat. The LLM selects, as the likely completion of the prompt, the highest probability completion of the probability distribution. In this manner, each LLM selects a likely completion from a distribution of completions.

Figure 6:
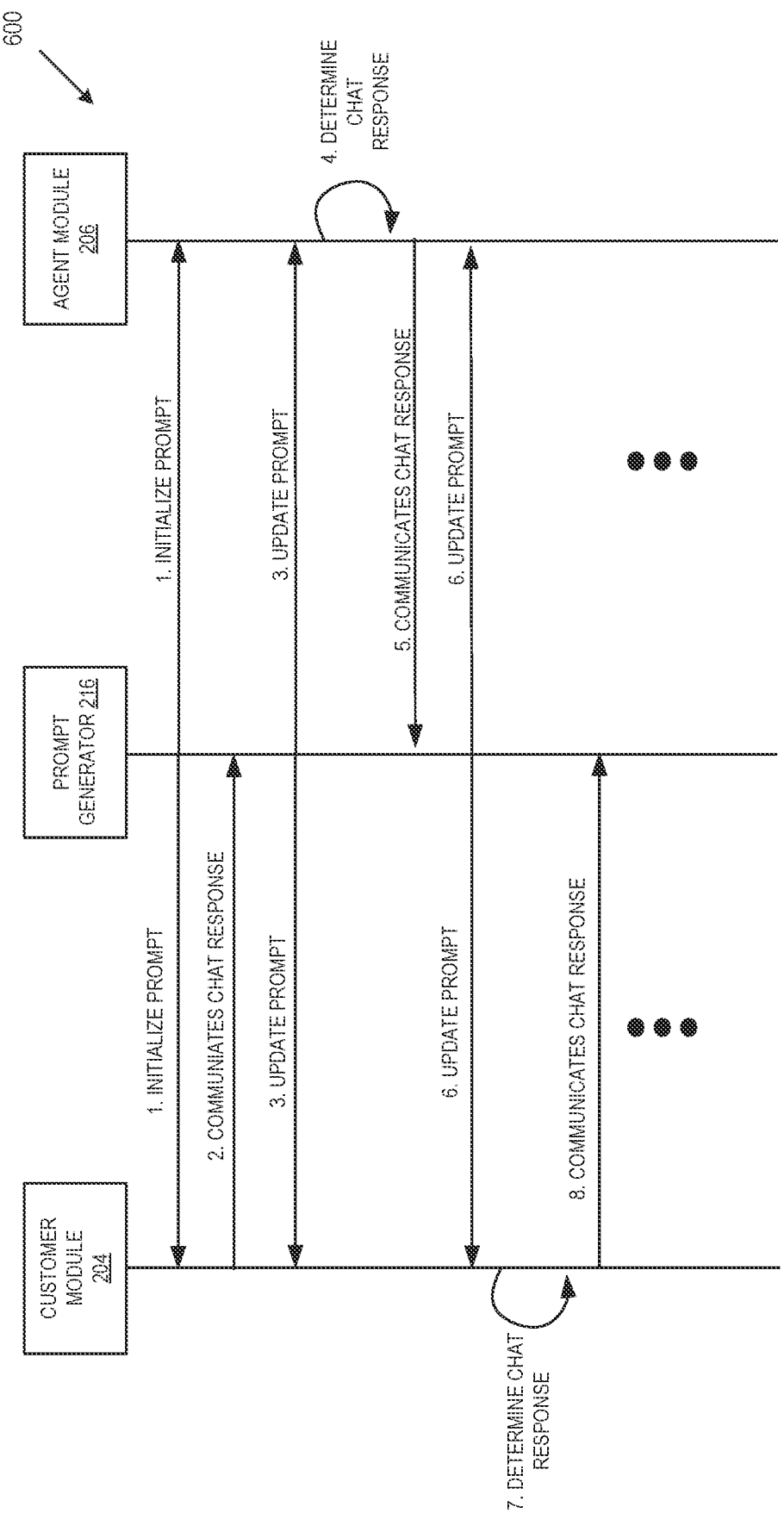
FIG. 6 illustrates an example synthetic conversation between a customer interlocutor and an agent interlocutor, in accordance with one or more embodiments.
Figure 7:
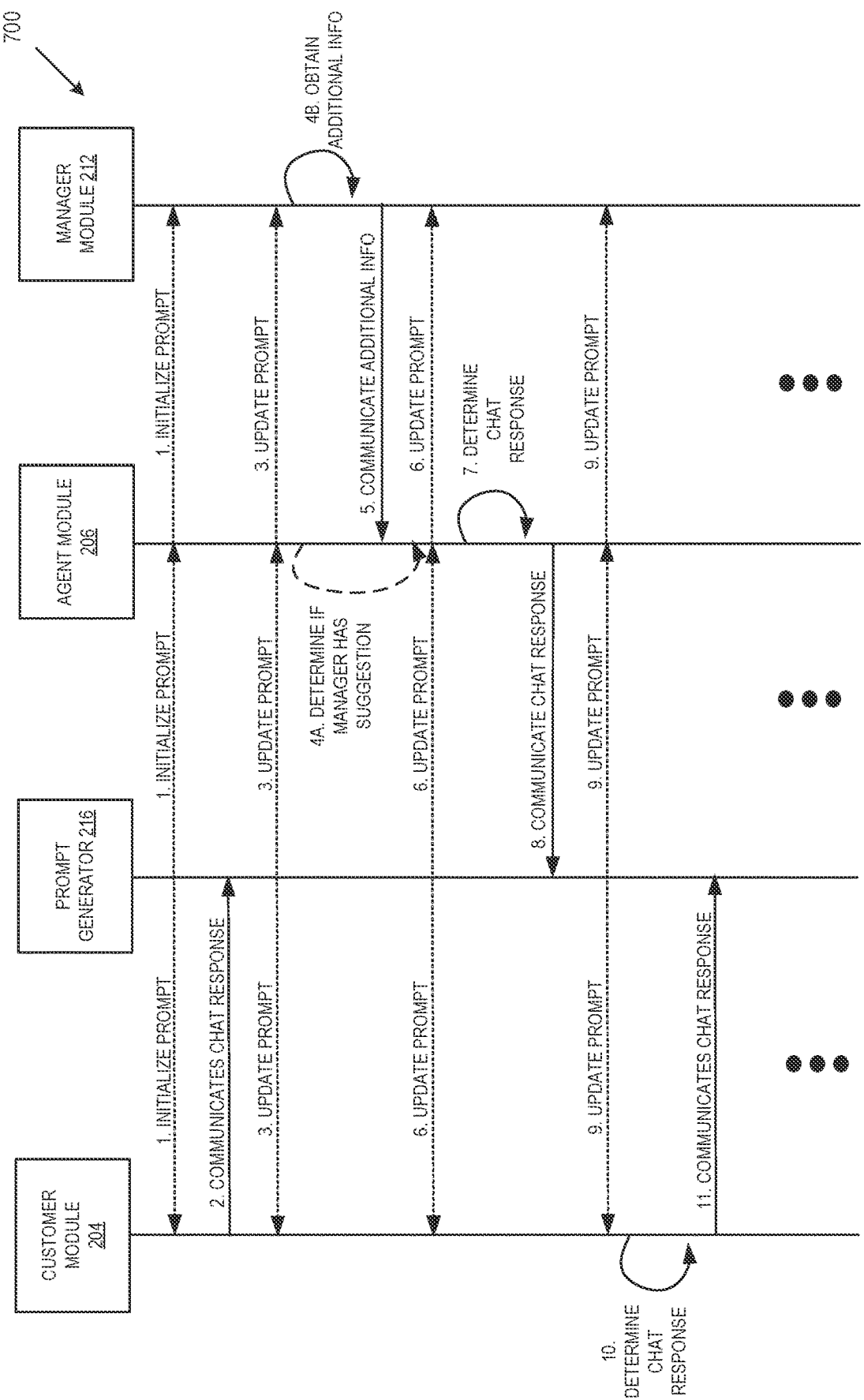
FIG. 7 illustrates another example synthetic conversation between a customer interlocutor and an agent interlocutor, in accordance with one or more embodiments.

Each interlocutor can include additional modules (e.g., the manager module 212 and/or the summarizer 208). The number of modules in each interlocutor may be different. For example, the agent interlocutor 222 may include the manager module 212 and the customer interlocutor 220 may not include the manager module 212. FIGS. 6 and 7 depict a synthetic conversation generated using LLM modules (e.g., the customer module 204, the agent module 206 and/or the manager module 212) of interlocutors.

The manager module 212 is a module configured to determine information about one or more interlocutors, obtain additional information about the one or more interlocutors, and guide the synthetic conversation between the interlocutors by interleaving information, suggestions, and the like. For ease of description, the manager module 212 is described as part of the agent interlocutor 222 that obtains information about the customer module 204 for the agent module 206 and/or provides suggestions to the agent module 206. However, as shown, a manager module may also be part of the customer interlocutor 220 and obtain information about the agent module 206 for the customer module 204 and/or provide suggestions to the customer module 204.

In operation, the manager module 212 tunes the synthetic conversation by guiding the agent module 206 to ask relevant questions about the customer module 204 and/or providing information about the customer module 204 to the agent module 206. The manager module 212 is also configured to inject stylistic/tone suggestions to be implemented by the agent module 206. The manager module 212 provides assistance (or otherwise interleaves information/suggestions into the synthetic conversation) responsive to being triggered. The manager module 212 is triggered based on a progression of the synthetic conversation (e.g., a number of iterations of the synthetic conversation, an elapsed time duration between iterations of the synthetic conversation, etc.), one or more keywords identified in the synthetic conversation, received metadata associated with the synthetic conversation, and the like. As described herein, the frequency of the triggered assistance from the manager module 212 is tuned according to a score of the synthetic chat. For example, if a scorer module (described herein) scores a synthetic chat low, then the frequency of the interjections (e.g., suggestions and/or additional information) interleaved into the conversation by the manager module 212 increases. As described herein, the frequency of the interjections is tuned by an adjuster module adding one or more rules (if the manager module 212 is a rule system), adding more opportunities for injection in a prompt (if the manager module 212 is an LLM), and the like.

Figure 3:
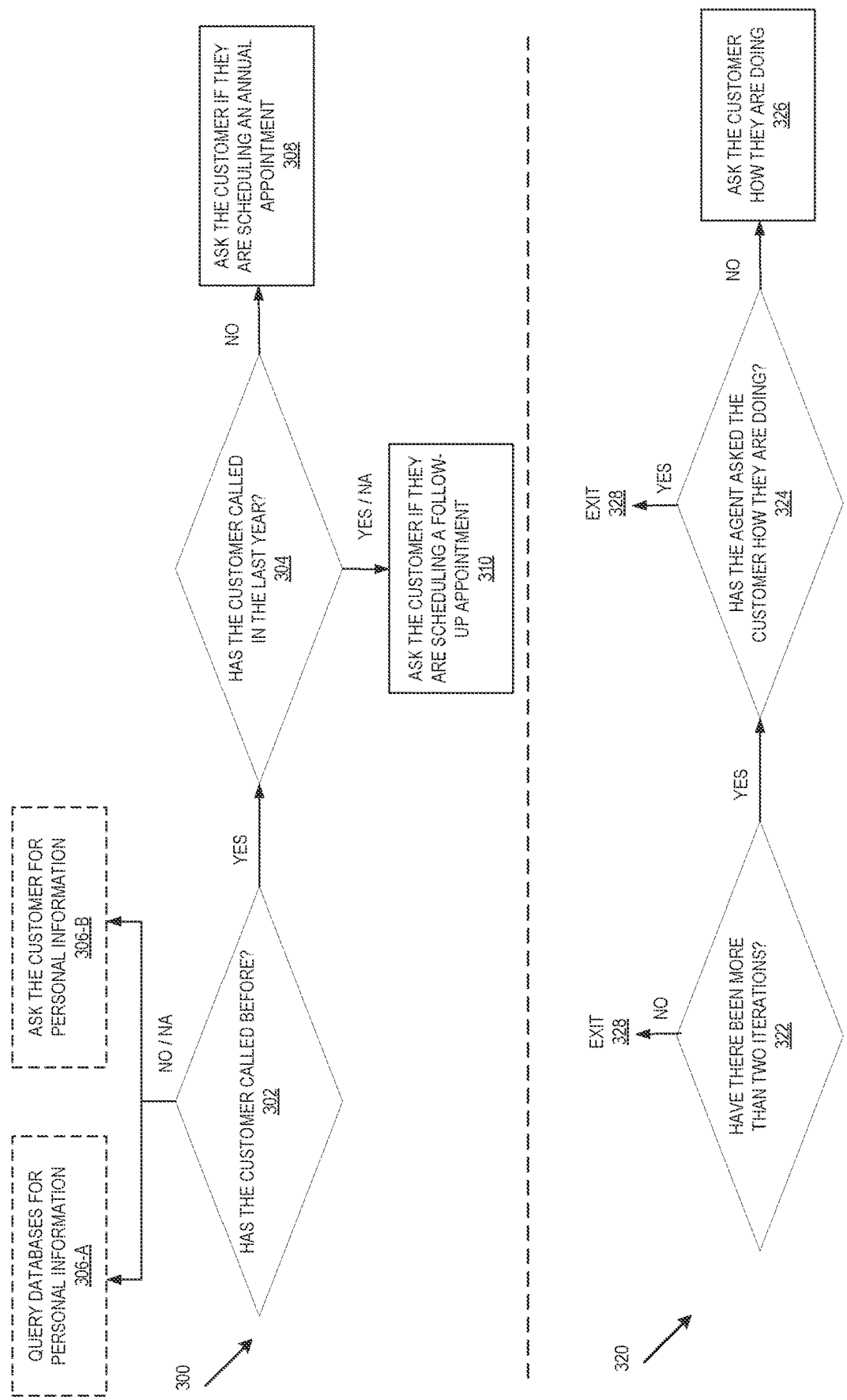
FIG. 3 illustrates examples of chains of if-else statements the manager module executes, in accordance with one or more embodiments.

The manager module 212 is triggered to provide assistance such as obtaining additional information about a user such as the customer module 204, obtaining additional information about a communication device associated with the user such as metadata, providing suggested chat responses, providing stylistic adjustments, and the like. As shown, one or more manager modules 212 may operatively communicate with data store 230 to retrieve such additional information. Data store 230 may be any data structure (such as a database) containing data about users (e.g., patient information), data about the domain (e.g., additional doctor preferences, specialties, etc.), and the like. The manager module 212 determines such assistance based on the configuration of the manager module 212. For example, in some embodiments, the manager module 212 is configured as a rule system storing a set of predefined rules. In these implementations, the manager module 212 provides assistance to the agent module 206 using one or more chains of if-else statements (e.g., one or more sets of rules). FIG. 3 illustrates an example of if-else statements executed by the manager module 212.

The manager module 212 may execute one or more similarity analyses and/or semantic analyses to determine whether the manager module 212 should initiate the one or more sets of predefined rules. Analyses that the manager module 212 performs include latent semantic indexing, Levenshtein distance algorithms, cosine similarity, and the like. For example, the manager module 212 may apply cosine similarity to calculate the similarity of strings by comparing a string received in a chat response of the synthetic chat to a string in a predefined rule. If the string similarity satisfies a threshold, the manager module 212 determines that the string received in the chat response is similar enough to the string in the predefined rule such that the manager module 212 should execute the predefined rule.

In a non-limiting example, the manager module 212 may include the predefined rule shown in Expression (1) below:

$$\text{If: "sports"} \rightarrow \text{Then: "I'm sorry, I don't discuss sports."} \qquad (1)$$

In a synthetic chat between the customer interlocutor 220 and the agent interlocutor 222, the customer module 204 may generate a chat response such as "What did you think about the Dodger game last night?" The manager module 212 may perform one or more similarity/semantic analyses to determine that "Dodger" refers to "sports." As such, the manager module 212 executes the predetermined rule indicated in Expression (1) and suggests to the agent module 206 that the agent module 206 respond "I'm sorry, I don't discuss sports."

In other embodiments, the manager module 212 is a machine learning model. The manager module 212 may use predictors (e.g., neural networks, LLMs) to predict additional information about the interlocutors. For example, the manager module 212 employs a LLM to determine a likely completion. The likely completion may be a question identified by the manager module 212 that facilitates the synthetic conversation between the customer module 204 and the agent module 206. In other embodiments, the manager module 212 uses classifiers (e.g., a random forest, a support vector machine), to determine a relevant question that facilitates the synthetic conversation. For example, the manager module 212 identifies a class (e.g., a relevant question) based on the prompts, metadata, and the like.

In response to being triggered to provide assistance, the manager module 212 may query one or more data stores 230, call one or more application programming interfaces (APIs), or perform other information retrieval techniques.

The summarizer module 208 is an LLM configured to extract information from synthetic chats. In some embodiments, the summarizer module 208 may perform other operations such as an extraction operation or translation operation, and the like. One or more interlocutors can include a summarizer module 208. For example, the summarizer module 208 can provide an ongoing synthetic chat summary to the manager module 212 and/or the agent module 206 (or the customer module 204). For ease of description, the summarizer module 208 is discussed with reference to the data scoring subsystem 104, but it should be appreciated that the summarizer module 208 may be included as part of one or more interlocutors.

FIG. 3 illustrates examples of chains of if-else statements the manager module 212 executes, in accordance with one or more embodiments. FIG. 3 illustrates two if-else statements (e.g., rules) associated with the synthetic conversation, but the manager module 212 may store multiple rules and/or sets of rules. In the examples 300 and 320, a customer interlocutor 220 is calling an agent interlocutor 222. The manager is part of the agent interlocutor 222 and is therefore not directly involved in the synthetic conversation. In operation, the manager module 212 provides assistance to the agent interlocutor 222 (e.g., the agent module 206) that interfaces with the customer interlocutor 220 (e.g., the customer module 204).

Example 300 is an example of a rule associated a specific customer. At condition 302, the manager module 212 determines whether the customer interlocutor 220 has called before. As described herein, the manager module 212 is configured to receive metadata such as the customer phone number associated with the call, an IP address associated with the call, a timestamp of the call (e.g., a date and time), and other information associated with the calling customer. The manager module 212 may determine a response to the condition at 302.

In some implementations, the manger module 212 obtains information to traverse the chain of if-else statements. For example, the manager module 212 queries a customer database to determine if the customer has called before. The manager module 212 determines whether the customer has called before if a telephone number associated with the calling customer matches a telephone number stored in a customer database. If the manager module 212 determines that the customer has called before, the manager module 212 progresses down the chain of if-else statements to condition 304. If the manager module 212 determines that the customer has not called before, the manager module 212 progresses to 306-A or 306-B depending on how the manager module 212 is configured.

In other implementations, the manager module 212 does not obtain information to traverse the chain of if-else statements. For example, the manager module 212 may determine that it does not have the information to determine whether the customer has called before. In this scenario, the manager module 212 traverses the "NA" path of the chain of if-else statements and progresses to 306-A or 306-B.

If the manager module 212 is configured to obtain additional information about the user, then at 306-A, the manager module 212 queries additional information about the customer for the agent module 206. The manager module 212 obtains the information and relays the personal information to the agent module 206. The agent module 206 may respond to the customer module 204 using the additional information. If the manager module 212 is not configured to obtain additional information about the user, then at 306B, instead of soliciting additional information from one or more databases, the manager module 212 identifies a relevant question to propose to the agent module 206. As shown in 306-B, the manager module 212 suggests to the agent module 206 that the agent module 206 should ask the customer module 204 for their personal information.

At condition 304, the manager module 212 determines whether the customer has called in the last year. The manager module 212 may compare the timestamp associated with the inbound call to timestamps stored in one or more databases associated with the customer. If the manager module 212 determines that that the customer has not called in the last year, then at 308, the manager module 212 determines that a relevant question to propose to the agent module 206 is whether the customer is scheduling an annual appointment. Accordingly, the manager module 212 suggests to the agent module 204 that the agent module 204 should ask such a question. If the manager module 212 determines that the customer has called in the last year, then at 310, the manager module 212 determines that a relevant question to propose to the agent module 206 is whether the customer is scheduling a follow up appointment. Accordingly, the manager module 212 suggests to the agent module 204 that the agent module 206 should ask such a question. At both 310 and 308, the manager module 212 provides guidance/assistance to the agent module 206 in the form of suggested chat responses.

Example 320 is an example of a rule associated with the synthetic conversation itself. At condition 322, the manager module 212 determines whether the synthetic conversation has lasted longer than two iterations. If the synthetic conversation has not lasted longer than two iterations, then the manager module 212 exits the rule (until a next iteration) at 328. If the synthetic conversation has lasted more than two iterations, then the manager module 212 evaluates whether the agent module 206 has asked the customer module 204 how they were doing (or a different stylistic question directed to being polite). If the agent module 206 has asked the customer module 204 how they were doing, then the manager module 212 exits the rule at 328. If the agent module 206 has not asked the customer module 204 how they were doing, then at 326 the manager module 212 suggests that the agent module 206 ask the customer module 204 how they are doing.

Figure 4:
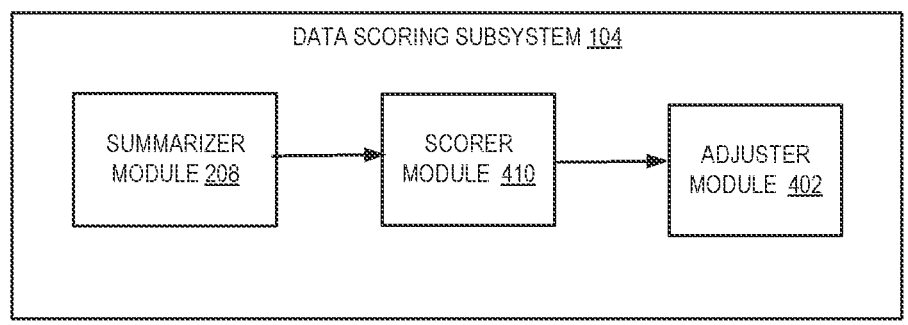
FIG. 4 illustrates modules of the data scoring subsystem, in accordance with one or more embodiments.

FIG. 4 illustrates modules of the data scoring subsystem 104, in accordance with one or more embodiments. The data scoring subsystem 104 scores synthetic conversations generated by the data generation subsystem 102 and, based on the score, adjusts a parameter associated with the synthetic chat. Parameters associated with the synthetic chat may be one or more aspects of the machine learning system 100 that improve a score of a subsequent synthetic conversation.

As described herein, the summarizer module 208 is an LLM configured to extract information from the synthetic chat. The summarizer module 208 extracts categories of state information based on the categories of state information sampled by the prompt generator 106. For example, the prompt generator 106 may generate the prompt for the customer module 204 by sampling pools of state information associated with a category related to preferred appointment time. Accordingly, the prompt generator 106 generates the prompt for the summarizer module 208 by telling the summarizer module 208 to extract information associated with a preferred appointment time. In operation, the prompt generator 106 generates the prompt for the summarizer module 208 using questions related to the categories of state information provided to the customer module 204 and/or agent module 206. The summarizer module 208 extracts the state information from the synthetic chat by answering slot-filling questions. An example summarizer prompt is "What is the preferred appointment time of the customer module 204?" In some embodiments, the summarizer module 208 may perform other operations such as an extraction operation, translation operation, and the like.

As described herein, merely providing the agent module 206 and the customer module 204 with state information does not correspond to such state information being shared in the synthetic conversation. As such, the summarizer module 208 is used to determine what state information was shared during the synthetic conversation by identifying (or extracting) state information shared during the synthetic conversation. Accordingly, the summarizer module 208 also determines what state information was not shared during the synthetic conversation by identifying state information that was not shared (or is missing) from the synthetic conversation.

In a non-limiting example, the prompt generator 106 may generate a prompt for the customer module 204 by randomly sampling a pool associated with a preferred appointment time. Accordingly, the prompt generator 106 generates a prompt for a summarizer module, asking the summarizer module 208 to extract a preferred appointment time.

In the present example, the customer module 204 initiates the synthetic conversation in a first iteration with "Hi, I would like to schedule an appointment." In a subsequent and final iteration, the agent module 206 responds with "Ok, I have booked an appointment for you. Goodbye." In this example, the agent module 206 booked the appointment without obtaining at least the customer's preferred appointment time. As such, the summarizer module 208 does not extract the appointment time because the appointment time was never discussed in the synthetic chat.

The scorer module 410 is configured to score the synthetic chat generated by the interlocutors. In some implementations, the scorer module 410 is configured to score a set of chats. The scorer module 410 evaluates synthetic chat(s) by assessing factors independent of how the synthetic chat was generated such as general linguistic properties of the chat. For example the scorer module 210 can assess the diversity of the language used by the interlocutors in the synthetic chat, the tone of the interlocutors in the synthetic chat, the complexity (e.g., the vocabulary) used by the interlocutors in the synthetic chat, the length of the chat responses (e.g., a length of average sentences used by the interlocuters in the synthetic chat, whether the chat was superfluous), and the like. In some implementations, some general linguistic properties of the chat are weighted such that some linguistic properties affect the score of the synthetic chat more than other properties.

The scorer module 410 can be configured to evaluate the linguistic properties of the chat (or turns of the chat, completions determined by the one or more LLMS, and the like), using any one or more algorithms. For example, the scorer module 410 may evaluate the complexity of the chat by tracking a number of turns (e.g., iterations) of the synthetic chat and comparing, in aggregate, the turns against a target distribution.

The scorer module 410 may also evaluate a degree of repetition of the synthetic chat by determining whether a block of text (e.g., an utterance communicated by one interlocutor) is repeated (or has been repeated in a semantically similar way). Repetition of the synthetic chat may be evaluated by the scorer module 410 on a turn-by-turn basis within a single synthetic chat, or across multiple chats. The scorer module 410 is configured to perform Levenshtein distance algorithms, for instance, to evaluate the similarity of utterances, and/or cosine similarity, for instance, to evaluate the similarity of utterances in an embedding space.

The scorer module 410 may also evaluate the completion determined by one or more LLMs by comparing the completion to one or more baseline/reference texts. For example, the scorer module 410 may determine the Bilingual Evaluation Understudy Score (BLEU score), which involves counting and weighing n-grams, where an n-gram is a sequence of n-words.

The scorer module 410 may also evaluate the tone and/or sentiment of the chat (or turns of the chat, completions determining by the one or more LLMS, and the like), using any one or more off the shelf machine learning models. For example, an off the shelf machine learning model may receive text (e.g., a turn) and classify the sentiment of the turn into one or more sentiment classes.

The scorer module 410 may also evaluate the complexity/vocabulary of the chat (or turns of the chat, completions determining by the one or more LLMS, and the like), by weighting a sum of the words used in the chat (or n-grams in the turn, utterance, chat, etc.).

Additionally or alternatively, the scorer module 410 evaluates synthetic chat(s) by assessing how the synthetic chat was generated (e.g., the content of the synthetic chat). For example, the scorer module 410 can evaluate whether the unique states of each interlocutor were conveyed in the synthetic chat. The scorer module 210 can compare categories of state information supplied to each LLM in the LLM prompt to extracted state information from the synthetic chat. In operation, the scorer module 410 compares the summary of the synthetic chat (e.g., the filled-in slots determined by the summarizer module based on the categories of state information provided to the customer module 204 and/or agent module 206) to the prompts of the customer module 204 and/or the agent module 206. In some embodiments, the scorer module 410 compares the filled-in slots determined by the summarizer module to a summary of the prompts of the customer module 204 and/or the agent module 206.

The scorer module 410 can use any suitable scoring mechanism to score the quantity and quality of state information extracted from the synthetic chat. For example, the scorer module 410 may assign points to extracted state information and compare the assigned points to a total point value based on the categories of state information and/or the state information provided to each LLM by the prompt generator 106. In some implementations, the scorer module 410 weighs categories such that the absence or presence of state information associated with such weighted categories in the synthetic chat affects the value of the score more/less. For example, a synthetic chat missing an appointment time may receive a lower score than a synthetic chat missing a name of a customer based on the "appointment time" category being weighted more than the "name" category.

The scorer module 410 is also configured to execute one or more semantic/similarity analyses to compare the extracted state information to the state information provided to the LLMs in the LLM prompt (e.g., the prompt of the agent module 204 and/or the customer module 206). Analyses that the scorer module 410 performs include latent semantic indexing, Levenshtein distance algorithms, cosine similarity, and the like. For example, a customer module 204 may receive a customer name via the prompt. The prompt may say: "Your name is Alexander." The summarizer module 208 may determine from the synthetic chat that the customer's name was Alex. The scorer module 410 may determine that the name "Alex" is similar to "Alexander."

In some embodiments, the scorer module 410 may algorithmically combine various sub-scores (e.g., one or more scores associated with general linguistic properties of the chat and one or more scores associated with the content of the chat) to determine an overall score for the synthetic chat.

The adjuster module 402 is configured to make one or more adjustments to one or more parameters associated with the synthetic chat based on the score received from the scoring module 410. The one or more parameters associated with the synthetic chat include (1) adjusting the prompts determined by the prompt generator 106; (2) adjusting the weights of the LLMs; (3) adjusting a frequency of assistance determined by the manager module 212 to tune the interplay of the interlocutors; and/or (4) any adjustment of a hyperparameter. In some embodiments, the adjuster module 402 improves the synthetic chat by rescoring a distribution of likely completions determined by one or more LLMs.

In some implementations, the adjuster module 402 randomly adjusts one or more parameters associated with the synthetic chat in one or more ways. For example, the adjuster module 402 may increase the frequency of assistance determined by the manager module by a randomly sampled integer. In some implementations, the adjuster module 402 is bounded by one or more constraints. For example, the frequency of assistance may be adjusted by a randomly sampled integer between 1-10.

In some implementations, the adjuster module 402 utilizes a table to map a score to one or more adjustments to the machine learning system 200. For example, the adjuster module 402 maps a score to one or more predetermined rules of the predetermined rule system. Table 4 below illustrates score mapping used to update prompts.

TABLE 4

Score Mapping to Update Prompts

| Score | Prompt |
|---|---|
| 0-33 | Ask/Respond to no more than one question each iteration |
| 33-80 | Confirm information received |
| 80-100 | No prompt change |

In some implementations, the prompt adjustments and/or score thresholds are manually determined. In other implementations, the prompt adjustments and/or score thresholds are determined using reinforcement learning, described with reference to FIG. 5. In other implementations, the adjuster module 402 is a machine learning module that makes adjustments to one or more parameters of the synthetic chat using reinforcement learning. For example, responsive to receiving a low score, the adjuster module 402 uses reinforcement learning to adjust the prompt of the agent module 206 to increase the number of questions asked to the customer, to check its own state information before the agent module 206 schedules an appointment, and the like. Reinforcement learning is described with reference to FIG. 'L.

As described herein, the prompt generator 106 may generate prompts in such a way that the adjuster module 402 may sample from or otherwise optimize. For example, the prompt generator 106 generates prompts according to blocks of texts that may occur in any order or may not occur at all. The adjuster module 402 may adjust the blocks of text present in the prompts and/or the order of the blocks of text present in the prompt by sampling the blocks of text generated by the prompt generator 106.

The adjust module 402 may be further configured to constrain the prompts generated by the prompt generator 106 by only sampling from a grammar. As is known in the art, a grammar defines a set of expansion rules and terminal conditions that describe when expansion stops. Accordingly, the adjuster module 402 may add sentences to the prompts generated by the prompt generator 106 by recursing a rule. For example, a rule begins with a starting token and is expanded by the adjuster module 402 by randomly sampling an expansion rule from the set of expansion rules. The adjuster module 402 continues expanding the sentence until the adjuster module 402 hits a terminal condition.

The adjuster module 402 is also configured to tune the weights of the LLMs (e.g., the customer module 204, the agent module 206, the manager module 212). In some embodiments, a user determines how to adjust the weights of one or more LLMs and the adjuster module 402 transmits such weight modifications to each of the LLMs. In other embodiments, the adjuster module 402 uses reinforcement learning to determine how to adjust the weights of one or more LLMs and transmits such weight modifications to each of the LLMs. In yet other embodiments, the adjuster module 402 automatically determines how to adjust the weights of the one or more LLMs using data selection and any conventional model fine-tuning process. The adjuster module 402 selects data for fine-tuning the weights of the one or more LLMs by identifying chats associated with a highest score determined by the scorer module 410. By changing the weights of the LLM models, the LLM model is more likely to generate completions that look like the fine-tuned data (e.g., the chats that received high scores).

The adjuster module 402 is also configured to tune one or more hyper parameters of one or more interlocutors. As described herein, the interlocutor includes at least one module (e.g., an LLM) but may also include other modules (e.g., manager modules, summarizer modules, ASR modules, etc.). The adjuster module 402 may adjust one or more hyperparameters of an interlocutor (including the one or more modules associated with each interlocutor). Hyperparameters may include a model stochasticity, a threshold value, and the like. For example, a module stochasticity associated with one or more interlocutors may be adjusted. Moreover, one or more threshold values associated with one or more interlocutors may be adjusted.

In some implementations, the adjuster module 402 adjusts such hyperparameters randomly. For example, one or more hyperparameters of one or more interlocuters may be randomly sampled, and one or more values corresponding to the one or more hyperparameters may be randomly sampled and updated. In some implementations, the adjuster module 402 is bound by one or more constraints. For example, the model stochasticity is adjusted by the adjuster module 402 by a value randomly sampled between 0-1. In other implementations, the adjuster module 402 is constrained to update the model stochasticity (or other hyperparameter) by an amount corresponding to the score determined by the scorer module 410.

The adjuster module 402 is also configured to adjust the interleaving of the modules (e.g., the customer module 204, the agent module 206, and/or the manager module 212). For example, the adjuster module 402 can increase the frequency of assistance provided by the manger module 212 to the customer module 204 and/or the agent module 206. For example, the adjuster module 402 adds predefined rules (if the manager module 212 is a rule system) and/or adds text to a prompt (if the manager module 212 is an LLM) such that the manager module 212 injects suggestions/additional information more frequently into the synthetic conversation.

In a non-limiting example, the scorer module 410 scores the synthetic chat low because the agent module 206 and customer module 204 did not agree on an appointment and a maximum number of iterations (e.g., 10 iterations) was reached. Based on the score of the synthetic chat, the adjuster module 402 adds one or more predefined rules (or adds a free text description to a prompt) to the manager module 212. An example prompt can include: "If the customer module 204 asks to book an appointment with at a time that a doctor is unavailable, suggest an alternate doctor that is available at that same time." The manager module 212 is facilitating the synthetic conversation by providing relevant suggestions to the agent module 206 that may result in the agent module 206 and the customer module 204 agreeing on an appointment, thus improving the score of a synthetic chat.

The adjuster module 402 is also configured to rescore a distribution. As described herein, each LLM determines a distribution of completions for each prompt. The LLM selects a likely completion from the distribution of completions. However, the adjuster module 402 may rescore the distribution of completions. In this manner, the adjuster module 402 adjusts which completion is the likely completion of the prompt determined by the agent module 206, the customer module 204, or a different LLM.

Figure 5:
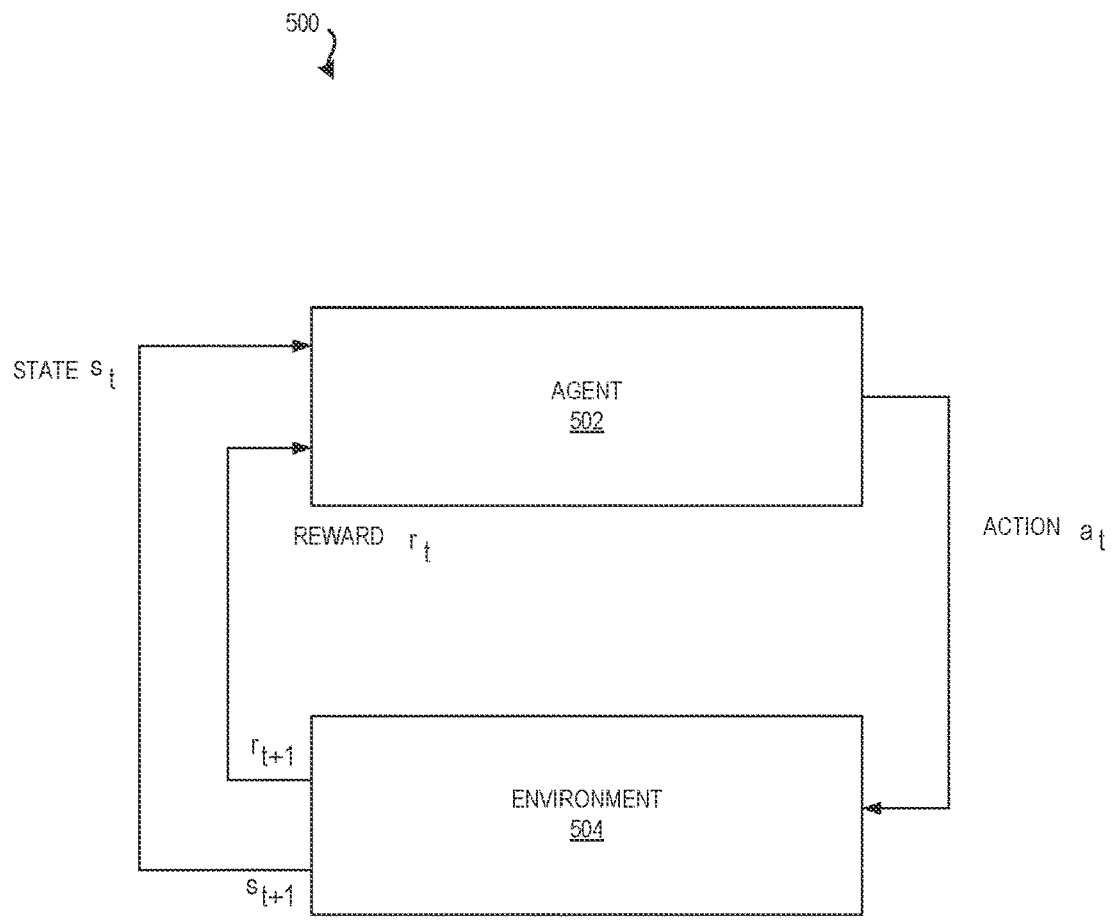
FIG. 5 illustrates a simple example of a reinforcement learning system, in accordance with one or more embodiments.

FIG. 5 illustrates a simple example of a reinforcement learning system 500, in accordance with one or more embodiments. In reinforcement learning, an agent 502 interacts with an environment 504. An "agent" refers to a learner or trainer. One or more agents are initialized, attempt modifications (e.g., LLM prompt suggestions, manager module interjection opportunities), learn whether the modifications are beneficial, and propose a set of modifications (e.g., improved LLM prompts, additional manager module interjection opportunities in the form of additional sets of predefined rules and/or additional prompts) based on the trained reinforcement learning model. The "environment" refers to the synthetic conversation. At each time step t, the agent 502 observes a state and selects an action from a set of actions. The possible set of actions include stylistic modifications to LLM prompts, tonal modifications to LLM prompts, additional manager module interjection opportunities in the form of additional sets of predefined rules and/or additional prompts, modifications to weights of LLMS, and the like. Accordingly, the possible set of actions span any of the adjustments to the machine learning system 200 (e.g., adjusting the prompt determined by the prompt generator 106, adjusting the weights of the LLMs and/or adjusting the interactions of the manager module 212 to tune the interplay of the interlocutors).

Agent 502 may select an action based on the value of taking each action, where the value of selecting the action is defined as the expected reward received when taking that action from the possible set of action. Agent 502 may select actions based on exploratory actions and exploitation actions. An exploratory action improves an agent's knowledge about an action by using the explored action in a sequence resulting in a reward calculation. An exploitation action is a "greedy" action that exploits the agent 502 current action-value estimates. Using epsilon-greedy action selection, for example, the agent 502 balances exploratory actions and exploitation actions. In some embodiments, the agent 502 selects an epsilon value and performs an exploitation action or an exploratory action based on the value of the epsilon and one or more exploitation and/or exploration thresholds. In other embodiments, the agent 502 randomly selects an epsilon value and/or selects an epsilon value from a predetermined distribution of epsilon values. In yet other embodiments, agent 502 selects an action using a policy, where the policy maps states (and observations) to actions. The policy provides the probability of taking a certain action when the agent is in a certain state. The agent is in one state out of various states at the conclusion of one or more synthetic chats.

In response to selecting an action (or multiple actions), the environment 504 changes, and there may be a new state $s_{t+1}$. The agent 502 receives feedback, indicating how the action affected the environment 504. The scorer module 410 provides feedback to the agent, indicating whether the score associated with the one or more scored synthetic chats is better or worse than a previous one or more scores of synthetic chats. If the score associated with the synthetic chat is higher than one or more previous synthetic chats, then the agent 502 receives positive feedback. If the score associated with the synthetic chat is lower than one or more previous synthetic chats, then the agent 502 receives negative feedback.

The agent 502 learns (e.g., reconfigures the policy) by taking actions and analyzing rewards. The rewards received responsive to the action are based on the feedback received by the agent 502. A reward function such as $R(s_t)$, $R(s_t, a_t)$, and/or $R(s_t, a_t, s_{t+1})$ can quantify the rewards received based on the state of the agent 502 (e.g., a score of one or more previous synthetic chats, a current score of one or more chats) and/or an action taken (e.g., updating a prompt).

At each new time step t, the agent 502 selects a policy and an action based on the current state (e.g., score) and the agent 502 calculates a reward. Each time step, the agent 502 iteratively increases a summation of rewards.

One goal of reinforcement learning is to determine a policy that maximizes the cumulative set of rewards, determined via the reward function. The adjuster module 402 weighs policies based on the reward determined at each step (or a series of step) such that certain policies (and actions) are encouraged and/or discouraged in response to the environment 504 being in a certain state. That is, in response to a synthetic conversation receiving a certain score. The policies are optimized by taking the gradient of an objective function (e.g., the reward function) to maximize the cumulative sum of rewards at each step, or after a predetermined number of steps (e.g., a delayed reward).

In some implementations, the rewards at each step may be compared (e.g., on an iterative basis) to a baseline. The baseline may be an expected performance (e.g., a satisfactory score), or an average performance (e.g., an average score over a series of step). Evaluating a difference between the baseline and the reward is considered evaluating a value of advantage (or advantage value). The value of the advantage indicates how much better the reward is from the baseline. If the adjuster module 410 does not compare the rewards to a baseline, then the adjuster module determines an indication of which actions were rewarded and which actions were penalized.

The agent 502 learns by choosing the action(s) based on policies that provide the highest cumulative set of rewards. The one or more agents (e.g., agent 502 of the adjuster module 410) may continue training until a predetermined threshold is satisfied. For instance, the agent 502 continues training until the advantage value is within a predetermined satisfactory score threshold. Additionally or alternatively, the agent 502 continues training until a predetermined number of steps (or a series of steps called episodes) have been reached.

FIG. 6 illustrates an example synthetic conversation between a customer interlocutor and an agent interlocutor, in accordance with one or more embodiments. At numeral 1, the prompt generator 106 initializes a prompt for both the customer module 204 and the agent module 206. As described herein, the initialized prompt for the customer module 204 includes one or more categories of state information unique to the customer module 204 (e.g., unknown to the agent module 206). Similarly, the initialized prompt for the agent module 206 includes categories of state information unique to the agent module 206 (e.g., unknown to the customer module 204). In example 600, the customer module 204 is configured to initialize the synthetic chat. Accordingly, at numeral 2, the customer module 204 communicates a chat response intended for the agent module 206. An example chat response is "Hi, can I please schedule an appointment?"

At numeral 3, the prompt generator 106 intercepts (or otherwise receives) the chat response intended for the agent module 206 and updates the prompt of the agent module 206. In some embodiments, the prompt generator 106 also updates the prompt of the customer module 204. By updating the prompt of the customer module 204, the customer module 204 tracks the responses that the customer module 204 has communicated. In response to receiving the updated prompt from the prompt generator 106, at numeral 4, the agent module 206 determines a chat response. As described herein, determining the chat response includes determining a likely completion of the prompt. By determining the likely completion, the agent module 206 determines a response that mimics the style and tone of the received prompt. An example chat response is "Hi, yes you can schedule an appointment. What day would be best?"

At numeral 5, the agent module 206 communicates the chat response intended for the customer module 204. At numeral 6, the prompt generator 106 intercepts the chat response intended for the customer module 204 and updates the prompt of the customer module 204. In some embodiments, the prompt generator 106 also updates the prompt of the agent module 206. By updating the prompt of the agent module 206, the agent module 206 tracks the responses that the agent module 206 has communicated. In response to receiving the updated prompt from the prompt generator 106, at numeral 7, the customer module 204 determines a chat response. As described herein, determining the chat response includes determining a likely completion of the prompt. By determining the likely completion, the customer module 204 determines a response that mimics the style and tone of the received prompt. An example chat response is "Wednesday the $7^{th}$ would be best for me." At numeral 8, the customer module 204 communicates the chat response intended for the agent module 206.

The synthetic conversation continues until a termination condition has been satisfied. Termination conditions include a number of iterations, a duration of time, one or more keywords detected by the prompt generator 106 (or other module of one or more interlocutors), and the like. Terminating keywords can include any repeated chat response, "goodbye", "let me speak to your manager", and the like. In some embodiments, after the conversation is terminated, the conversation is stored to create a synthetic conversation dataset.

As described herein, an iteration is a single response. For example, a first iteration is the initiation of the synthetic chat by the customer interlocutor (e.g., the chat response communicated by the customer module 204 at numeral 2). A second iteration is the chat response communicated to the customer interlocutor (e.g., the chat response communicated by the agent module 206 to the customer module 204 at numeral 5). A third iteration is the chat response communicated to the agent interlocutor (e.g., the chat response communicated by the customer module 204 to the agent module 206 at numeral 8).

In example 600, the prompt generator 216 globalizes information by updating each of the prompts of the LLM modules (e.g., at numeral 3 and numeral 6). In other embodiments, the prompt generator 216 does not globalize information by updating each of the prompts of the LLMs. In these embodiments, the prompt generator 216 updates the prompts of the LLM intended for the communication. For example, at numeral 3, the prompt generator 216 may update the prompt of the agent module 206 and the manager module 212 (because the manager module 212 is associated with the agent module 206). At numeral 6, the prompt generator 216 may update the prompt of the agent module 206.

FIG. 7 illustrates another example synthetic conversation between a customer interlocutor and an agent interlocutor, in accordance with one or more embodiments. As described herein, the interlocutor can include one or more modules. FIG. 7 illustrates a scenario in which the customer interlocutor includes the customer module 204, and the agent interlocutor includes the agent module 206 with assistance from the manager module 212. As described herein, in some embodiments the manager module 212 operates according to one or more sets of predefined rules. In other embodiments, the manager module 212 is an LLM. In example 700, the manager module 212 is an LLM.

At numeral 1, the prompt generator 106 initializes a prompt for the customer module 204, the agent module 206, and the manager module 216. As described herein, the initialized prompt for the customer module 204 includes one or more categories of state information unique to the customer module 204 (e.g., unknown to the agent module 206 and/or manager module 212). Similarly, the initialized prompt for the agent module 206 includes one or more categories of state information unique to the agent module 206 (e.g., unknown to the customer module 204 and/or the manager module 212). Further, the initialized prompt for the manager module 212 includes one or more categories of state information unique to the manager module 212 (e.g., unknown to the customer module 204 and/or the agent module 206). In example 700, the customer module 204 is configured to initialize the synthetic chat. Accordingly, at numeral 2, the customer module 204 communicates a chat response intended for the agent module 206. An example chat response is "Hi, can I please schedule an appointment?"

At numeral 3, the prompt generator 106 intercepts (or otherwise receives) the chat response intended for the agent module 206 and updates the prompt of the agent module 206 and the manager module 212. In some embodiments, the prompt generator 106 also updates the prompt of the customer module 204. In operation, the prompt generator 106 updates the prompts of the LLMs (e.g., the customer module 204, the agent module 206, and the manager module 212), effectively globalizing the information provided in the chat by the customer module 204 at numeral 2. By updating the prompt of the customer module 204, the customer module 204 tracks the responses that the customer module 204 has communicated.

At numeral 4A, the agent module 206 determines if the manager module 212 has a suggestion (or other information)

for the agent module 206 based on the chat response communicated at numeral 2. The agent module 206 determines if the manager module 212 has a suggestion by waiting a threshold duration of time. If the agent module 206 does not receive a suggestion or other information from the agent module 206 during the predetermined duration, of time, the agent module 206 proceeds to numeral 7 to determine a chat response.

At numeral 4B, the manager module 212 intercepts (or otherwise receives) the chat response intended for the agent module 206 (e.g., by receiving the updated prompt from the prompt generator 216 at numeral 3). The manager module 212 may obtain additional information associated with the customer module 204 based on the chat response (or metadata) communicated by the customer module 204 at numeral 2. In some embodiments, the manager module 212 does not provide additional information and/or suggestions to the agent module 206 based on the intercepted chat response. For example, the intercepted chat response does not trigger any of the manager module 212 predefined rules. In other embodiments, the manager module 212 does provide additional information and/or suggestions to the agent module 212 based on the intercepted chat response.

In a non-limiting example, the prompt generator 106 at numeral 3 globally updates the LLM prompts to include metadata (e.g., a phone number associated with the customer module 204). Using the metadata, the manager module 212 queries one or more databases to determine a patient file associated with a calling patient (e.g., the customer module 204). The manager module 212 uses such metadata to obtain additional information about the customer module 204 (e.g., a name of the patient associated with the phone number, a patient history, patient preferences, etc.).

At numeral 5, the manager module 212 communicates additional information intended for the agent module 206. An example of additional information communicated to the agent module 206 is "The caller's name is Kathy and she is due for a check-up with doctor X."

At numeral 6, the prompt generator 106 intercepts the additional information intended for the agent module 206 and updates the prompt of the agent module 206 and the customer module 204. In some embodiments, the prompt generator 106 also updates the prompt of the manager module 212. In operation, the prompt generator 106 globalizes the additional information about the customer module 204 determined at numeral 4B. By updating the prompt of the manager module 212, the manager module 212 tracks the additional information obtained about the customer module 204. In other embodiments, the prompt generator 106 only updates the prompt of the agent module 206 associated with the manager module 212. That is, the prompt generator 106 may not globalize the additional information determined by the manager module 212, and may only update the prompt of the associated interlocutor (e.g., agent module 206).

At numeral 7, in response to receiving the updated prompt from the prompt generator 106 at numeral 6, the agent module 206 determines a chat response. In some embodiments, the chat response incorporates the additional information obtained by the manager module 212. As described herein, determining the chat response includes determining a likely completion of the prompt. By determining the likely completion, the agent module 206 determines an intelligent response to the chat response communicated to the agent module 206 at numeral 2. An example response is "Hi, is this Kathy trying to schedule an appointment with Dr. X?"

At numeral 8, the agent module 206 communicates the chat response intended for the customer module 204. At numeral 9, the prompt generator 106 intercepts the chat response intended for the customer module 204 and updates the prompt of the customer module 204 and the manager module 212. In some embodiments, the prompt generator 106 also updates the prompt of the agent module 206. In operation, the prompt generator 106 updates the prompts of the LLMs (e.g., the customer module 204, the agent module 206, and the manager module 212), effectively globalizing the information provided in the chat by the agent module 206 at numeral 8. By updating the prompt of the agent module 206, the agent module 206 tracks the responses that the agent module 206 has communicated.

In response to receiving the updated prompt from the prompt generator 106, at numeral 10, the customer module 204 determines a chat response. As described herein, determining the chat response includes determining a likely completion of the prompt. By determining the likely completion, the customer module 204 determines a response that mimics the style and tone of the received prompt. An example chat response is "Yes, I am Kathy and I am trying to schedule an appointment with Dr. X." At numeral 11, the customer module 204 communicates the chat response intended for the agent module 206.

As described herein, the synthetic conversation continues until a termination condition has been satisfied. Termination conditions include a number of iterations, a duration of time, one or more keywords detected by the prompt generator 106 (or other LLM), and the like. Terminating keywords can include any repeated chat response, "goodbye", "let me speak to your manager", and the like. In some embodiments, after the conversation is terminated, the conversation is stored to create a synthetic conversation dataset.

As described herein, an iteration is a single response. For example, a first iteration is the initiation of the synthetic chat by the customer interlocutor (e.g., the chat response communicated by the customer module 204 at numeral 2). A second iteration is the additional information communicated by the manager module 212 to the agent module 206 at numeral 5. A third iteration is the chat response communicated to the customer interlocutor by the agent interlocutor (e.g., the chat response communicated by the agent module 206 to the customer module 204 at numeral 8). A fourth iteration is the chat response communicated to the agent interlocutor (e.g., the chat response communicated by the customer module 204 to the agent module 206 at numeral 11).

In example 700, the prompt generator 216 globalizes information by updating each of the prompts of the LLM modules (e.g., at numeral 3, numeral 6, and numeral 9). In other embodiments, the prompt generator 216 does not globalize information by updating each of the prompts of the LLMs. In these embodiments, the prompt generator 216 updates the prompts of the LLM intended for the communication. For example, at numeral 3, the prompt generator 216 may update the prompt of the agent module 206 and the manager module 212 associated with the agent module 206. At numeral 6, the prompt generator 216 may update the prompt of the agent module 206. At numeral 9, the prompt generator 216 may update the prompt of customer module 204.

FIG. 8 illustrates an example implementation of the machine learning system 200 including a customer module 204, an agent module 206, a summarizer module 208, and a scorer module 410, in accordance with one or more embodiments. As described herein, the agent module 206 and the customer modules 204 generate synthetic data in the form of a synthetic chat, sharing their unique state information with one another to schedule an appointment. FIG. 8 illustrates the scorer module 410 assessing the synthetic chat of the customer module 204 and the agent module 206 by comparing the state information of the customer module 204 and the state information of the agent module 206 to the state information extracted from the synthetic chat.

Each interlocutor is provided information that is unknown to the other interlocutors. As described herein, the information is state information representing each interlocutor state of mind. The state information is generated and distributed to the LLMs of each interlocutor via a prompt. In particular, the prompt generator 106 provides customer module 204A associated with customer interlocutor X with prompt 882A, and customer module 204B associated with customer interlocutor Y with prompt 882B. For example, as shown in the Customer Module 204A Prompt 882A, customer X associated with customer module 204A prefers Dr. X performing appointment type A between 8:00 am-11:00 am. Similarly, as shown in the Customer Module 204B Prompt 882B, customer Y associated with customer module 204B prefers either Dr. Y or Dr. X performing appointment type A between 11:00 am-3:00 pm.

The prompt generator 106 also provides agent module 206 associated with the agent interlocutor with prompt 884. As shown in prompt 884, the doctor availability and appointment type of each doctor is communicated to the agent module 206.

As described herein, each pair of customer-agent conversations (e.g., customer module 204A associated with a customer interlocutor X and agent module 206 associated with an agent interlocutor; and customer module 204B associated with a customer interlocutor Y and agent module 206 associated with the agent interlocutor) participate in a conversation resulting in a synthetic chat. During the conversation, the customers and agents exchange information that are unknown to the opposite conversant. For example, the customer interlocutor X (e.g., via the customer module 204A) exchanges the customer name ("e.g., X") unknown to the agent interlocutor (e.g., via the agent module 206).

The summarizer module (e.g., summarizer module 208 of FIG. 2) is configured to extract information from the synthetic chat. As described herein, the summarizer module 208 is configured to extract categories of state information, identified by row 810, provided to customer module and/or agent module.

The scorer module 410 scores the synthetic conversation (e.g., how well the agent module 206 collected information from the customer module 804) based on what the summarizer module 208 extracts from the synthetic conversation. As described herein, the scorer module 410 may also score factors independent of how the synthetic chat was generated such as linguistic properties of the chat, but such tables are not illustrated. The results of the scorer module 410 scoring the content of the chat are shown in tables 888, 812, 816, and 820 as an illustrative example. It can be assumed that what the summarizer module 208 extracts from the synthetic chat adequately conveys information exchanged during the synthetic conversation.

The results of the summarizer module of synthetic chat 1 determined using customer module 204A and agent module 206 are indicated in Table 886. As described herein, the scorer module 410 is configured to score the results of the summarizer module by comparing the results of the summarizer module to the state information. In operation, the scorer module 410 compares the filled-in slots determined by the summarizer module (based on the categories of state information provided to the customer module 204 and/or agent module 206) to the prompts of the customer module 204 and/or the agent module 206.

The summarizer module 208 is unable to extract the name of the customer from the synthetic chat (identified by "N/A" at 836) because the name of the customer was never disclosed during synthetic chat 1. The scorer module 410 considers the agent module's 206 failure to obtain the name of the customer. As such, the scorer module 410 scores the synthetic chat 1 between the customer interlocutor A and agent interlocutor indicated by 852 of the Results of the Scorer Module 210 of Synthetic Chat 1 Table 88. As shown, the information provided to each interlocutor (e.g., a customer module 204 and/or an agent module 206) is not necessarily shared during the synthetic conversation. The prompt of the agent module 206, the weights of the agent module 206, and/or information received by the agent module 206 (e.g., via a manager module 212) should be tuned to increase the score of the synthetic conversation. In an example implementation, the adjuster module 402 adds a sentence to the prompt of the agent module 206 such as "You ask the customer for their name at the beginning of the call."

As indicated by 838 of the Results of the Summarizer Module 208 of Synthetic Chat 2 Table 810, the agent module 204 learned the name of the customer interlocutor operated by the customer module 204A. As such, the summarizer module extracted the name of the customer from the synthetic conversation, indicated by "A" at 838. The scorer module 410 considers the success of the agent module 206 in obtaining the state information. As such, the scorer module 410 scores the synthetic chat 2 between the customer interlocutor A and the agent interlocutor at 854 of the Results of the Scorer Module 210 of the Synthetic Chat 2 Table 812.

Table 814 provides an example of Results of the Summarizer Module 208 of a Synthetic Chat 3 between a customer interlocutor B (executed via customer module 804B) and an agent interlocutor (executed via the agent module 206). The scorer module 410 is configured to score the results of the summarizer module by comparing the results of the summarizer module to the state information. In operation, the scorer module 410 compares the filled-in slots determined by the summarizer module (based on the categories of state information provided to the customer module 204 and/or agent module 206) to the prompts of the customer module 204 and/or the agent module 206.

As indicated by 816 and 826, the agent module 206 scheduled customer B with Dr. Y to perform a Type B appointment. However, according to the Customer Module 204B Preamble 82B, customer module 204B requested a Type A appointment and was willing to see Dr. Y or Dr. X. As indicated by the Agent Module 206 Prompt 884, the agent module 206 should not have scheduled Dr. Y with customer module 204B because Dr. Y only performs Type B appointments.

The scorer module 410 considers the agent module's 206 failure to obtain the state of customer module 204B (and/or incorrectly synthesize the collected data from customer module 204B). As such, the scorer module 410 scores the synthetic chat 3 between the customer interlocutor B and agent interlocutor indicated by 862 of the Results of the Scorer Module 410 of Synthetic Chat 3 Table 816.

As indicated by 818 and 828 of the Results of the Summarizer Module 208 of Synthetic Chat 4 Table 818, the agent module 206 scheduled Dr. X to perform a type B appointment for customer B during synthetic chat 4. As such, the scorer 410 will determine that the conversation resulting in synthetic chat 4 was more closely aligned with the state information of the customer module 204B included in the Customer Module 204B Prompt 882B and the state information of the agent module 206 included in the Agent Module 206 Prompt 884. As such, the scorer module 410 scores the synthetic chat 4 between the customer interlocutor B and agent interlocutor indicated by 864 of the Results of the Scorer Module 410 of Synthetic Chat 4 Table 820.

As described herein, the machine learning system 200 of FIG. 1 assesses and improves the deployment of LLMs in specific domains. Once one or more LLMs satisfy one or more conditions in a specific domain, the LLM(s) may be deployed. An example condition of deployment includes a threshold score over a predetermined number of synthetic chats. As described with reference to FIG. 2, the one or more LLMs are configured as an automated interlocutor. For example, the agent interlocutor 222 may include one or more LLMs (and other modules). Accordingly, the agent interlocutor 222 is deployed in a specific domain responsive to the LLMs satisfying one or more conditions.

Figure 9:
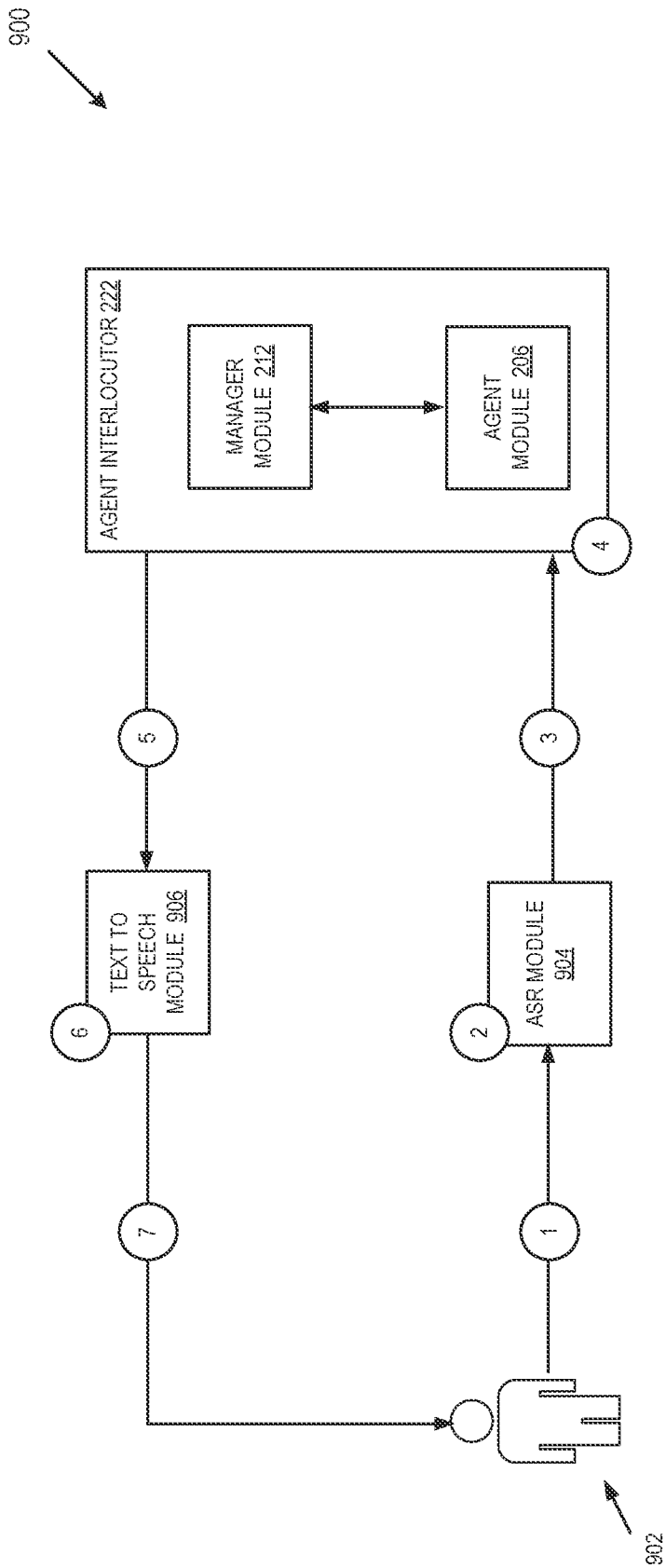
FIG. 9 illustrates an example deployment of the agent interlocutor, in accordance with one or more embodiments.

FIG. 9 illustrates an example deployment of the agent interlocutor 222, in accordance with one or more embodiments. As shown, the agent interlocutor 222 includes an agent module 206 and a manager module 212. As described herein, the agent interlocutor 222 can include one or more additional modules. For example, the ASR module 904 and/or text to speech module 906 may be included in the agent interlocutor 222. When the agent interlocutor 222 is deployed, the improvements associated with the synthetic chat are also deployed (e.g., the one or more parameters). The improvements made to the synthetic chat improve the reliability of the agent interlocutor in servicing the user 902 or otherwise communicating with the user 902. The one or more parameters deployed with the agent interlocutor include (1) any adjustment of the weights of any LLMs executed by the agent interlocutor; (2) any adjustment of the prompts of any of the LLMs executed by the agent interlocutor; (3) any adjustment of the frequency of assistance from one or more modules such as the manager module 212; and/or (4) any adjustment of a hyperparameter. In some embodiments, the synthetic chat is improved by rescoring a distribution of likely completions determined by one or more LLMs. As described herein, the manager module 212 is triggered to assist the agent module 204 by injecting/interleaving suggestions/information into a conversation based on a progression of the conversation (e.g., a number of iterations of the conversation, an elapsed time duration between iterations of the conversation, etc.), one or more keywords identified in the conversation, received metadata associated with the conversation, and the like. The frequency of such injections is adjusted (e.g., via the adjuster module 410) by adding one or more predefined rules to the manager module rule system (if the manager module 212 is a rule system) and/or tuning/updating the prompt of the manager module such that the manager module 212 is more involved in the conversation. For example, adding one or more predefined rules increases the likelihood that the manager module 212 will increase the frequency of assistance to the agent module 206.

Example 900 describes a user (e.g., user 902) calling a service provider and interacting with an automated customer service agent (e.g., agent interlocutor 222). The service provider has tuned the agent interlocutor 222 using synthetic conversations with a customer interlocutor (not shown) to service customers (e.g., user 902). It should be appreciated that a user may interact with the customer service agent in other mediums (e.g., audio, text, video, etc.). For example, a user may open up a web browser and initiate a message with a customer service agent. For ease of description, example 900 describes the implementation of the agent interlocutor 222 in a system configured for audio communication (e.g., a telephone call, a VoIP call, an intercom, etc.).

At numeral 1, a user 902 initiates communication with a service provider deploying an automated customer service agent. In example 900, the communication with the service provider is a telephone call. Once a communication link is established, the user 902 initiates a conversation with the agent interlocutor 222.

At numeral 2, the Automated Speech Recognition (ASR) module 904 recognizes the received audio from the user 902. The ASR module 904 may use any suitable method of text recognition such as any one or more natural language processing algorithms. In some embodiments, the audio is converted to text and further processed. For example, a summarizer module or other word parser can summarize the converted text.

In some embodiments, at numeral 2, the ASR module 904 (or other module) is configured to process one or more non-lexical features using one or more neural networks. For example, the ASR module 904 (or other module) can extract an emotion, an age, and/or a gender from the audio using audio features such as the Mel-frequency cepstral coefficients, energy, tone, frequency of words in the audio signal, dialect, vocabulary, etc., determined from the audio signal. The ASR module 904 passes the non-lexical features to the agent interlocutor 222 for further processing.

In other embodiments, the ASR module 904 (or other module) extracts the audio features from the audio signal and passes such features to a module in the agent interlocutor 222 for further processing. For example, one or more modules in the agent interlocutor 222 can determine an emotion, age, and/or gender using the audio features. In some implementations, the LLM framework of the agent module 206 can be modified to support ASR or other NLP functionality.

In yet other embodiments, the ASR module 904 (or other module) converts the non-lexical features into low dimensional metadata. For example, the ASR module 904 can convert an emotion non-lexical feature into a vector using one-hot encoding.

At numeral 3, the text and other data (e.g., metadata including non-lexical features) is fed to the agent module 206 and manager module 212 of the agent interlocutor 222. As described herein, LLM modules are configured to determine a likely completion of a free-text input. In some embodiments, the reception of the non-lexical features triggers the manager module 212 to perform additional processing. For example, the manager module 212 may be configured to identify a speaker using the received non-lexical features (or audio features). In this example, the manager module 212 queries a database for multiple speaker profiles and identifies a speaker (e.g., user 902) by matching (or clustering) the non-lexical features/audio features to a stored speaker profile.

At numeral 4, the agent module 206 processes the prompt to determine the likely completion. Based on the number of iterations of the conversation, metadata associated with the user 902 (e.g., a phone number, an IP address, a frequency of calling associated with the user, a time stamp, etc.), and/or trigger words in the conversation, the manager module 212 provides suggestions to the agent module 206 (e.g., stylistic suggestions, tone suggestions, chat response suggestions), additional information to the agent module 206 (e.g., metadata, information about the user 902), and the like. At numeral 5, the agent interlocutor 222 responds to the user communication at numeral 1.

At numeral 6, a speech to text module transforms the text determined by the agent interlocutor 222 (e.g., at numeral 4) into audible speech. For example, the speech to text module 906 generates a synthetic voice communicating the text determined by the agent interlocutor 222 to the user 902. In some embodiments (e.g., if the user 902 is communicating to the agent interlocutor 222 via messages), the text to speech module 906 is not executed. At numeral 7, the chat response determined by the agent interlocutor 222 is communicated to the user 902.

Figure 10:
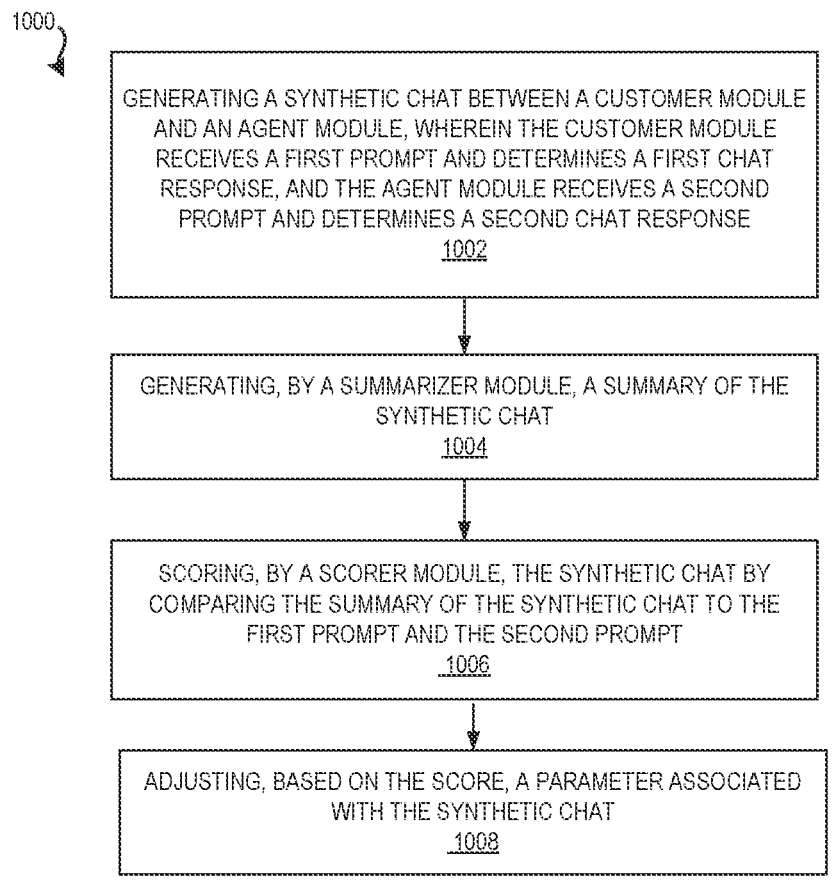
FIG. 10 illustrates a flowchart of a series of acts in a method of assessing and improving the deployment of LLMs in specific domains, in accordance with one or more embodiments.

FIGS. 1-12 provide a number of embodiments and components configured to perform such embodiments that allow for assessing and improving the deployment of LLMs in specific domains. FIG. 10 illustrates a flowchart of an example method of assessing and improving the deployment of LLMs in specific domains, in accordance with one or more embodiments. It should be appreciated that FIG. 10 may be performed with additional or fewer steps than those indicated in FIG. 10. Moreover, the order of the steps indicated in FIG. 10 may be rearranged without changing the scope of FIG. 10.

FIG. 10 illustrates a flowchart 1000 of a series of acts in a method of assessing and improving the deployment of LLMs in specific domains, in accordance with one or more embodiments. In one or more embodiments, the method 1000 is performed in a digital medium environment that includes the machine learning system 100.

As illustrated in FIG. 10, the method 1000 includes an act 1002 of generating a synthetic chat between a customer module and an agent module, where the customer module receives a first prompt and determines a first chat response, and the agent module receives a second prompt and determines a second chat response. The generation of synthetic data includes multiple iterations of interactions between interlocutor (e.g., the customer module and the agent module). Each iteration, the first prompt and the second prompt are updated. The first prompt and second prompt are generated by sampling state information from pools of state information, where the state information represents a state of mind (e.g., facts specific to the behavior/operation of the LLM and/or other general facts accessible to the LLM). Updating the first prompt and the second prompt comprises augmenting the second prompt with the first chat response and augmenting a third prompt received by the customer module with the second chat response. The first and second module are both LLMs configured to receive a prompt and determine a likely completion of the prompt. The prompts of each LLM codify a unique parameterized state of mind, and the likely completion of the prompt is a set of next words in an iteration of the synthetic chat.

As illustrated in FIG. 10, the method 1000 further includes an act 1004 of generating, by a summarizer module, a summary of the synthetic chat. The summary of the synthetic chat is based on one or more categories of state information, wherein the one or more categories of state information are used to generate the first prompt and the second prompt.

As illustrated in FIG. 10, the method 1000 further includes an act 1006 of scoring, by a scorer module, the synthetic chat by comparing the summary of the synthetic chat to the first prompt and the second prompt.

As illustrated in FIG. 1008, the method 1000 further includes an act 1008 of adjusting, based on the score, a parameter associated with the synthetic chat. One or more parameters associated with the synthetic chat include adjusting the first prompt, the second prompt, one or more weights of the customer module, one or more weights of the agent module, and/or a frequency of assistance determined by a fifth module and received by the second module.

In some embodiments, the method further comprises triggering a manager module to provide assistance to the agent module based on at least one of a progression of the synthetic chat, a keyword identified in the synthetic chat, and metadata associated with the synthetic chat. The agent module determines the second chat response based on the assistance. The frequency of the triggered assistance from the manager module is tuned according to the score of the synthetic chat. The assistance includes at least one of additional information associated with a communication device simulated by the customer module, a user corresponding to the customer module, a suggested chat response, and a stylistic adjustment.

Figure 11:
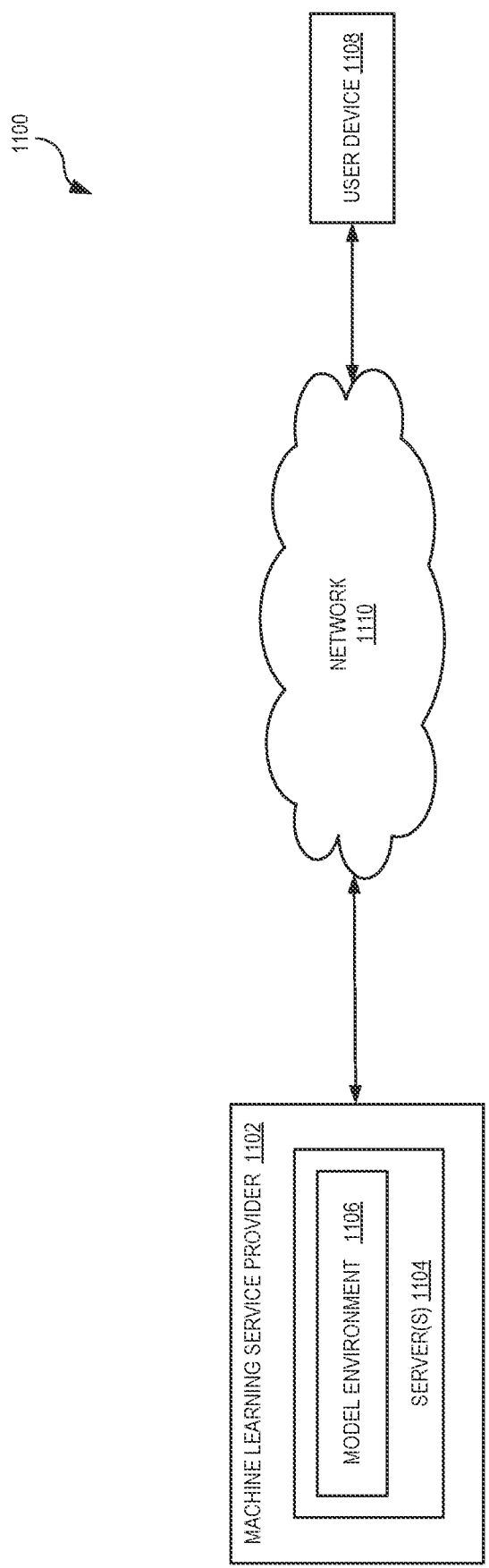
FIG. 11 illustrates a schematic diagram of an environment in which the machine learning system can operate in accordance with one or more embodiments.

FIG. 11 illustrates a schematic diagram of an environment 1100 in which the machine learning system 200 can operate in accordance with one or more embodiments. As shown, the environment 1100 includes a machine learning service provider 1102 communicating with a user device 1108 via a network 1110. It should be appreciated that while the user device 1108 is shown communicating with the machine learning service provider 1102 via network 1110, the user device 1108 may also communicate directly with the machine learning service provider 1102. The communication between the user device 808 and the machine learning service provider 1102 via network 1110 may be any communication such as wireless communication and/or wired communication. In an example implementation, the machine learning service provider 1102 may host the machine learning system on a server 1104 using the model environment 1106 and receive data from one or more user device(s) 1108 via network 1110.

The machine learning service provider 1102 may be a service provider configured to perform one or more tasks. The machine learning service provider 1102 includes one or more server(s) 1104 each including a model environment 1106. Each of the servers may be specialized to perform a given task of the machine learning service provider 1102. Accordingly, each server 1104 has a unique model environment 1106 that facilitates the operation of the server. The model environment 1106 may include any data necessary to perform the operations of the specific server 1104 (e.g., trained machine learning models, training data, machine learning libraries, machine learning functions, etc.). In other configurations, a single server may be configured to perform multiple tasks of the machine learning service provider 1102. That is, the server 1104 may include multiple model environments 1106.

The user device 1108 may be any computing devices configured to communicate data to the machine learning service provider 1102. In some implementations, the user device 1108 may capture or otherwise collect such data (e.g., using a camera, a microphone, some combination, or other sensor).

To illustrate, data from one or more user device(s) 1108 (e.g., audio data received by a client from a user device) may be fed to server 1104 via network 1110. Upon receiving the data, the server 1104 can execute the model environment 1106 to process the audio data and respond to the audio data. For example, an agent module 206 and a manager module 212 executed by one or more servers 1104 receives the audio data as part of a prompt and generates a response. The server(s) 1104 respond to the user device 1108 in a style/tone mimicking that of a human response. For example, the server(s) 1104 may respond to an inquiry about doctor availability for a particular appointment on a particular day. In some embodiments, before the server(s) 1104 respond to the user device, the response is exported to one or more additional server(s) 1104 for processing. For example, one or more additional server(s) 1104 may convert a text response to an audio response, translate a language of the response, and the like.

In some embodiments, the functions of the machine learning service provider 1102 may be implemented via a user device 1108. Additionally or alternatively, the functions of the user device 1108 may be implemented via the machine learning service provider 1102. The functions of the user device 1108 and/or machine learning service provider 1102 may be implemented in hardware, software, or both. For example, the user device 1108 and/or machine learning service provider 1102 may include instructions stored on a computer-readable storage medium and executable by processors of the user device 1108 and/or machine learning service provider 1102. Computer executable instructions may include instructions that cause one or more processors to perform one or more functions. The computer executable instructions may be stored in any computer-readable media accessible by one or more processors of the machine learning service provider 1102 and/or the user device 1108. In some embodiments, one or more portions of functions of the user device 1108 and/or machine learning service provider 1102 may be implemented in hardware, software, or both.

While one user device 1108 is shown, it should be appreciated that multiple user devices 1108 may communicate with the machine learning service provider 1102 via network 1110. Additionally or alternatively, multiple user device 1108 may communicate with each other (e.g., without communicating with machine learning service provider 1102). Moreover, while one machine learning service provider 1102 is shown, it should be appreciated that multiple machine learning service providers 1102 may communicate with one or more user devices 1108. Similarly, multiple machine learning service providers 1102 may communicate with each other (e.g., without communicating with the user device 1108).

Figure 12:
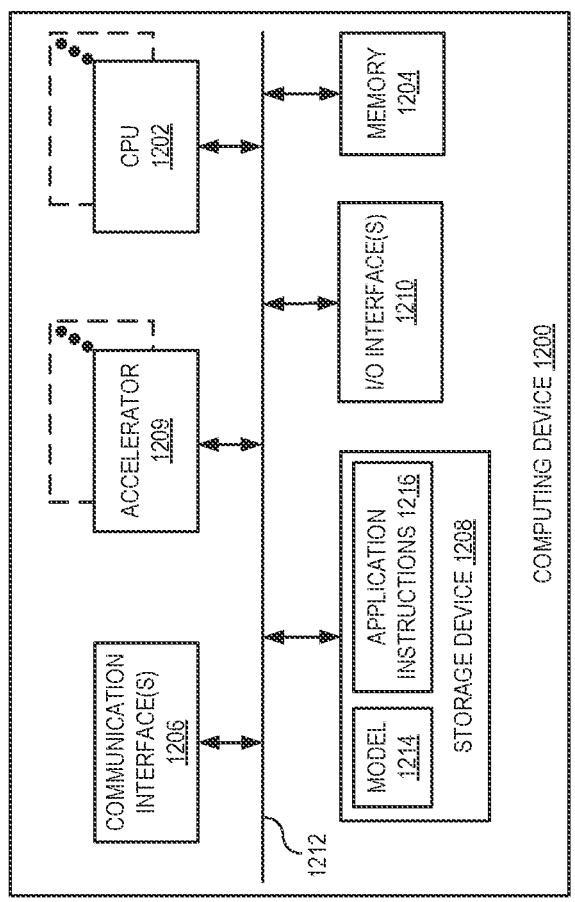
FIG. 12 illustrates a block diagram of an example computing device in accordance with one or more embodiments.

FIG. 12 illustrates a block diagram example computing device 1200 that may be configured to perform one or more of the processes described above. One or more computing devices such as the computing device 1200 may implement one or more portions of the machine learning system 120. As shown in FIG. 12, the computing device can comprise one or more central processing units (CPUs) 1202, memory 1204, one or more communication interfaces 1206, a storage device 1208, one or more I/O interfaces 1210 and one or more accelerators 1206. It should be appreciated that the computing device 1200 can include different components than those shown in FIG. 12.

In particular embodiments, CPU(s) 1202 include hardware and/or software for executing instructions. Similarly, accelerator(s) 1206 include hardware and/or software for executing instructions. In some embodiments, accelerator(s) 1206 include one or more graphics processing units (GPUs). In general, the accelerator(s) 1206 and CPU(s) 1202 fetch data from the storage device 1208 and/or memory 1204. For example, the accelerator(s) 1209 and CPU(s) 1202 may fetch instructions from the storage device 1208 and/or memory 1204 and execute one or more functions identified by the instructions. The CPU(s) 1202 and/or accelerator(s) 1209 execute the instructions to perform the one or more processes as described herein. For example, CPU 1202 may receive instructions from memory 1204 (e.g., non-transitory computer readable medium) and execute those instructions, resulting in one or more processes described herein.

The storage device 1208 and/or memory 1204 may include non-transitory computer readable memory such as non-volatile and/or non-volatile memory (RAM, ROM, EEPROM, CD ROM, SSDs, flash memory. The storage device 1208 and/or memory 1204 may be configured to store different types of data fetched by the CPU 1202 and/or accelerator 1209. For example, the memory 1204 may include instructions directed to the functional operation of the computing device 1200. Moreover, the storage device 1208 may include application instructions 1216 and/or models 1214 directed to the applicational use of the computing device 1200. For example, the model 1214 may include the machine learning system as described herein (e.g., machine learning system 120 in FIG. 1). The application instructions 1216 may contain instructions necessary to perform the functions of the machine learning system.

The computing device 1200 can further include one or more communication interfaces 1206. A communication interface 1206 can include hardware, software, or both configured to facilitate external communication with one or more external computing devices. The external communication with one or more external computing devices may be wireless communication and/or wired communication. The communication interface 1206 may be configured to facilitate such wired/wireless communication.

The bus 1212 can facilitate internal communication of the computing device 1200 and may comprise hardware, software, or both, coupling components of computing device 1200 to each other.

The computing device 1200 also includes one or more input or output ("I/O") interfaces 1210. The I/O interface 1210 is configured to receive inputs/outputs. In an example implementation, the I/O interface 1210 may receive user inputs (e.g., one or more preferences/configurations associated with the machine learning system 120, as described herein). Additionally or alternatively, the I/O interface 1210 may receive sensor inputs (e.g., camera images, video frames, etc.). The I/O interface 1210 may be configured to output one or more graphics/displays to a user using a display. Additionally or alternatively, the I/O interface 1210 may be configured to output data (e.g., an output associated with a performed application, such as performing the machine learning system 120) to one or more other computing devices.

Various embodiments have been described and illustrated. The descriptions and illustrations herein are not to be construed as limiting. Alternate embodiments may exist without departing from the scope of the embodiments described and illustrated herein.

Disjunctive language such as "at least one of A, B, or C" is not intended to imply that a given embodiment requires at least one of A, at least one of B, or at least one or C. Instead, it is intended to be understood to mean either A, B, or C, or any combination thereof.

What is claimed is:

1. A method comprising:
   receiving, by a customer large language model (LLM), an initialization customer prompt including customer state information associated with a set of customer state information categories;
   receiving, by an agent LLM, an initialization agent prompt including agent state information associated with a set of agent state information categories;

generating a synthetic chat comprising chat responses accumulated over a number of iterations between chat responses determined by the customer LLM and chat responses determined by the agent LLM, wherein during each iteration:
the customer LLM determines a customer chat response as one of the chat responses based on a received agent chat response and the initialization customer prompt, or
the agent LLM determines an agent chat response as one of the chat responses based on a received customer chat response and the initialization agent prompt;
extracting, by a summarizer LLM, a summary of the synthetic chat using a summarizer prompt including the set of customer state information categories and the set of agent state information categories, wherein the summary includes state information of the synthetic chat;
scoring, by a scorer module, the synthetic chat by comparing the state information from the summary of the synthetic chat to the customer state information of the initialization customer prompt and the agent state information of the initialization customer prompt;
adjusting, based on a score of the synthetic chat determined by the scorer module, the initialization agent prompt;
receiving, from a user of a user computing device, a first audio message comprising user speech;
converting the user speech into natural language text;
computing, by the agent LLM, a chat response based on the adjusted initialization agent prompt and the natural language text;
converting the chat response into a second audio message comprising a synthetic voice; and
causing communication of the second audio message comprising the synthetic voice to the user of the user computing device.

2. The method of claim 1, further comprising,
adjusting, based on the score of the synthetic chat determined by the scorer module,
one or more weights of the customer LLM;
one or more weights of the agent LLM;
a frequency of assistance determined by a fifth module and received by the agent LLM; and
one or more hyperparameters of the customer LLM or the agent LLM.

3. The method of claim 1, wherein determining the customer chat response by the customer LLM comprises a probability distribution of a set of next words generated by the customer LLM, wherein determining the agent chat response by the agent LLM comprises a probability distribution of a set of next words generated by the agent LLM, further comprising:
rescoring the probability distribution determined by the customer LLM based on the score, wherein the rescored probability distribution adjusts a most likely set of words generated by the customer LLM, or
rescoring the probability distribution determined by the agent LLM based on the score, wherein the rescored probability distribution adjusts a most likely set of words generated by the agent LLM.

4. The method of claim 1, wherein the initialization customer prompt is generated by sampling state information from pools of state information corresponding to the set of customer state information categories, wherein state information represents a set of facts specific to a behavior of the customer LLM.

5. The method of claim 1, wherein the customer LLM determines the customer chat response as one of the chat responses based on the received agent chat response and the initialization customer prompt further comprises:
updating the initialization customer prompt with a most recent received agent chat response.

6. The method of claim 1, wherein the agent LLM determines the agent chat response as one of the chat responses based on the received customer chat response and the initialization agent prompt further comprises:
updating the initialization agent prompt with a most recent received customer chat response.

7. The method of claim 1, wherein the initialization agent prompt is generated by sampling state information from pools of state information corresponding to the set of agent state information categories, wherein state information represents a set of facts specific to a behavior of the agent LLM.

8. A system comprising:
a customer large language model (LLM);
an agent LLM;
a summarizer LLM;
a scorer module;
a user computing device;
a processor configured to execute the customer LLM, the agent LLM, the summarizer LLM, and the scorer module; and
a memory including instructions which, when executed by the processor cause the system to:
receive, by the customer LLM, an initialization customer prompt including customer state information associated with a set of customer state information categories;
receive, by the agent LLM, an initialization agent prompt including agent state information associated with a set of agent state information categories;
generate a synthetic chat comprising chat responses accumulated over a number of iterations between chat responses determined by the customer LLM and chat responses determined by the agent LLM, wherein during each iteration:
the customer LLM determines a customer chat response as one of the chat responses based on a received agent chat response and the initialization customer prompt, or
the agent LLM determines an agent chat response as one of the chat responses based on a received customer chat response and the initialization agent prompt;
extract, by a summarizer LLM, a summary of the synthetic chat using a summarizer prompt including the set of customer state information categories and the set of agent state information categories, wherein the summary includes state information of the synthetic chat;
score, by a scorer module, the synthetic chat by comparing the state information from the summary of the synthetic chat to the customer state information of the initialization customer prompt and the agent state information of the initialization customer prompt;
adjust, based on a score of the synthetic chat determined by the scorer module, the initialization agent prompt;
receiving, from a user of the user computing device, a first audio message comprising user speech;
converting the user speech into natural language text;
computing, by the agent LLM, a chat response based on the adjusted initialization agent prompt and the natural language text;

converting the chat response into a second audio message comprising a synthetic voice; and causing communication of the second audio message comprising the synthetic voice to the user of the user computing device.

9. The system of claim 8, further comprising, adjusting, based on the score of the synthetic chat determined by the scorer module, one or more weights of the customer LLM;

one or more weights of the agent LLM;

a frequency of assistance determined by a fifth module and received by the agent LLM; and one or more hyperparameters of the customer LLM or the agent LLM.

10. The system of claim 8, wherein determining the customer chat response by the customer LLM comprises a probability distribution of a set of next words generated by the customer LLM, wherein determining the agent chat response by the agent LLM comprises a probability distribution of a set of next words generated by the agent LLM, and wherein the processor is further configured to execute instructions causing the system to:

rescore the probability distribution determined by the customer LLM based on the score, wherein the rescored probability distribution adjusts a most likely set of words generated by the customer LLM; or rescore the probability distribution determined by the agent LLM based on the score, wherein the rescored probability distribution adjusts a most likely set of words generated by the agent LLM.

11. The system of claim 8, wherein the initialization customer prompt is generated by sampling state information from pools of state information corresponding to the set of customer state information categories, wherein state information represents a set of facts specific to a behavior of the customer LLM.

12. The system of claim 8, wherein the customer LLM determines the customer chat response as one of the chat responses based on the received agent chat response and the initialization customer prompt further comprises:

updating the initialization customer prompt with a most recent received agent chat response.

13. The system of claim 8, wherein the agent LLM determines the agent chat response as one of the chat responses based on the received customer chat response and the initialization agent prompt further comprises:

updating the initialization agent prompt with a most recent received customer chat response.

14. The system of claim 8, wherein the initialization agent prompt is generated by sampling state information from pools of state information corresponding to the set of agent state information categories, wherein state information represents a set of facts specific to a behavior of the agent LLM.

* * * * *